United States Patent
Arai

(10) Patent No.: US 6,696,202 B2
(45) Date of Patent: Feb. 24, 2004

(54) ELECTRICAL APPLIANCE USING LITHIUM SECONDARY BATTERIES

(75) Inventor: Juichi Arai, Ibaraki-ken (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 09/799,122

(22) Filed: Mar. 6, 2001

(65) Prior Publication Data

US 2001/0010877 A1 Aug. 2, 2001

Related U.S. Application Data

(62) Division of application No. 09/253,136, filed on Feb. 19, 1999, now Pat. No. 6,210,835.

(30) Foreign Application Priority Data

Feb. 20, 1998 (JP) ............................................. 10-038333

(51) Int. Cl.$^7$ ............................ H01M 4/58; H01M 6/16
(52) U.S. Cl. .................. 429/231.95; 429/324; 429/199; 429/325; 429/333; 429/334; 429/335; 429/338; 429/341
(58) Field of Search ............................ 429/231.95, 324, 429/199, 325, 333, 334, 335, 338, 341

(56) References Cited

U.S. PATENT DOCUMENTS

| | | | |
|---|---|---|---|
| 5,519,563 A | * 5/1996 | Higashijima et al. | ......... 361/16 |
| 5,659,062 A | 8/1997 | Yokoyama et al. | |
| 5,705,912 A | 1/1998 | Ichihara | |
| 5,795,677 A | 8/1998 | Yamamoto et al. | ......... 429/194 |
| 6,022,641 A | 2/2000 | Endo et al. | ................. 429/232 |
| 6,475,680 B1 | * 11/2002 | Arai et al. | ................. 429/340 |

FOREIGN PATENT DOCUMENTS

| | | |
|---|---|---|
| EP | 0 512 340 | 11/1992 |
| EP | 0599534 A1 | 6/1994 |
| EP | 0631339 A2 | 12/1994 |
| EP | 0696077 A2 | 2/1996 |
| EP | 0704922 A1 | 4/1996 |
| EP | 0714148 A1 | 5/1996 |
| EP | 0757399 A1 | 2/1997 |
| EP | 0775701 A1 | 5/1997 |
| EP | 0806804 A1 | 11/1997 |
| EP | 0807986 A1 | 11/1997 |
| EP | 0 851 556 | 7/1998 |
| JP | 4-184370 | 7/1992 |
| JP | 5-62690 | 3/1993 |
| JP | 6-283205 | 10/1994 |
| JP | 7-192762 | 7/1995 |
| JP | 7-211356 | 8/1995 |
| JP | 7-249432 | 9/1995 |
| JP | 8-37042 | 2/1996 |
| JP | 8-64237 | 3/1996 |
| JP | 8-88023 | 4/1996 |
| JP | 9-293533 | 11/1997 |
| JP | 10-12272 | 1/1998 |
| JP | 10-50343 | 2/1998 |
| WO | 97/44842 | 11/1997 |

OTHER PUBLICATIONS

European International Search Report dated Jul. 4, 2003, for Application No. 99102731.9.

* cited by examiner

*Primary Examiner*—Carol Chaney
*Assistant Examiner*—Angela J Martin
(74) *Attorney, Agent, or Firm*—Antonelli, Terry, Stout & Kraus, LLP

(57) ABSTRACT

A lithium secondary battery comprising a negative electrode, a positive electrode, a separator and a non-aqueous liquid electrolyte, the non-aqueous liquid electrolyte having an electrical conductivity of 0.05 mS/cm or more and no such a flash point as specified by JIS-K2265 flash point test and comprising an ion nonconductive solvent and a lithium ion conductive solvent, is non-flammable and safe even at high temperatures.

7 Claims, 19 Drawing Sheets

ELECTRICAL APPLIANCE USING LITHIUM SECONDARY BATTERIES

This application is a Divisional application of Ser. No. 09/253,136, filed Feb. 19, 1999 now U.S. Pat. No. 6,210,835.

BACKGROUND OF THE INVENTION

The present invention relates to a lithium secondary battery using a non-aqueous liquid electrolyte containing lithium ions as migrating ions, the liquid electrolyte for the battery and use of the battery.

A lithium secondary battery using a non-aqueous liquid electrolyte has high potential and energy density and distinguished storage capacity and low temperature workability and has been widely used in consumer-oriented portable electrical products. Intensive researches and developments are now underway for battery scale-up for application to power storage systems during night hours for electric cars or domestic use.

However, most of solvents utilizable for such applications have a low flash point and a high flammability and thus have hazards of ignition, explosion, etc. due to overcharging, heating, etc. To assure the safety of the battery many approaches have been so far proposed.

For example, JP-A-7-192762 discloses mixing of a cyclic carbonate ester with flame retardant effect-expectable halogenated formate ester, thereby reducing the flammability. Furthermore, JP-A-8-45544 discloses mixing with a halogenated ester. However, the halogenated formate ester or halogenated ester has a lower flash point in some cases than non-halogenated cyclic carbonates and thus it seems that no satisfactory flame retardant effect can been attained thereby. JP-A-4-184370 and JP-A-8-88023 disclose another approach by adding a self-extinguishing effect-expectable phosphate ester to a liquid electrolyte, but the cycle characteristics are somewhat deteriorated thereby.

The foregoing approaches are examples of using a highly self-extinguishing solvent or an extinguishing solvent in a non-aqueous liquid electrolyte. The ultimate means of making a lithium secondary battery non-flammable is to use a per se non-flammable solvent of fluorine compound in the non-aqueous liquid electrolyte. As to the use of a fluorine compound, JP-A-9-293533 discloses addition of 0.5 to 30% by weight of a fluorinated alkane to a solvent, thereby making the solvent flame-retardant, where the fluorinated alkane acts as an extinguishing agent due to the suppressing effect of these low boiling point fluorine compounds on the flammability the resulting gas mixture. It cannot be said from the viewpoint of the mixing ratio that the disclosed liquid electrolyte is the one using a non-flammable solvent. Furthermore, JP-A-9-293533 discloses a flame retardation method comprising adding a fluorine compound having a boiling point of not more than 25° C. to the battery, allowing the fluorine compound to evaporate faster than the flammable solvent when the battery is exposed to high temperatures, so that the flammability of flammable solvent can be suppressed by the resulting vapors, where the non-flammable solvent is used not in the liquid electrolyte, but as separated from the liquid electrolyte.

BRIEF SUMMARY OF THE INVENTION

An object of the present invention is to provide a lithium secondary battery free from such hazards as explosion, ignition, smoke emission, etc. due to elevated temperatures, heating, overcharging, internal short circuits, etc., a non-aqueous liquid electrolyte for the battery, and use of the battery.

The present invention provides a lithium secondary battery, which comprises a negative electrode, a positive electrode, a separator and a non-aqueous liquid electrolyte, the non-aqueous liquid electrolyte having an electrical conductivity of 0.05 ms/cm or more and no such a flash point as specified by JIS-K2265 flash point test.

Furthermore, the present invention provides a non-aqueous liquid electrolyte for a lithium secondary battery, which comprises an ion nonconductive solvent and a lithium ion conductive solvent and has an electrical conductivity of 0.05 mS/cm or more and no such a flash point as specified by JIS-K2265 flash point test.

DETAILED DESCRIPTION OF THE INVENTION

Figure 1:
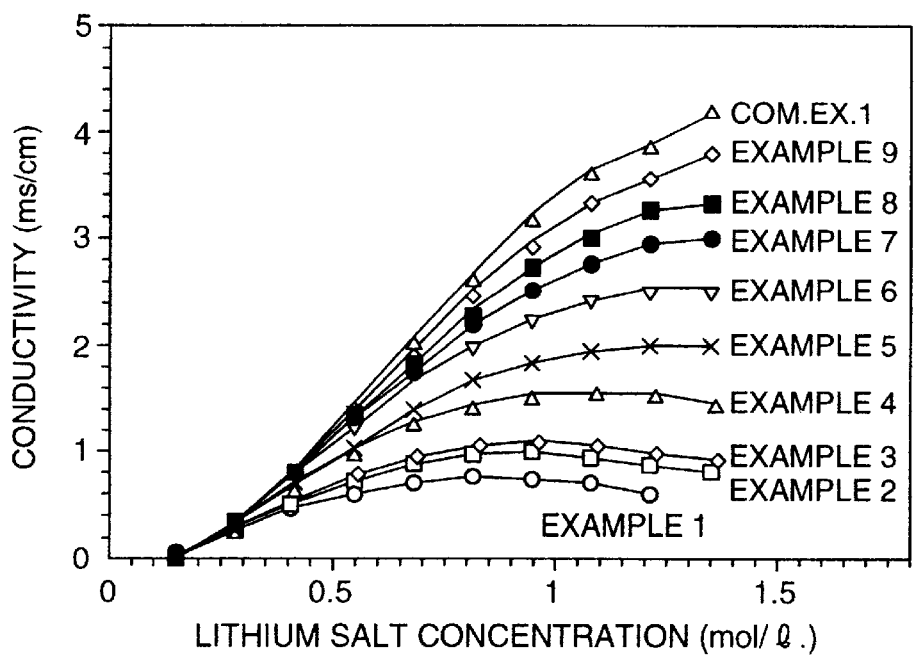
FIG. 1 is a graph showing relations between lithium salt concentration, solvent composition and conductivity of non-flammable liquid electrolyte according to embodiments of the present invention.

To overcome such hazards as explosion, ignition, smoke emission, etc. of lithium secondary battery due to elevated temperatures, heating, over-charging, internal short circuits, etc., it is important to make the liquid electrolyte non-flammable, thereby establishing the safety of the lithium secondary battery, as mentioned above. However, non-flammable liquids, typically non-flammable solvents are characterized in that generally the dipole moment is small and the dielectric constant is low, resulting in much poor solubility of lithium salts. Its compatibity with non-aqueous solvents having a large dipole moment and a good lithium salt dissociation capability is also low, and thus the non-flammable solvent cannot be mixed with the non-aqueous solvent, resulting in separation into two layers. That is, the non-flammable solvents fail to show all the physical properties required for the liquid electrolyte. However, it is indispensable for scaling-up of the lithium secondary battery and widespread proliferation thereof to electric cars and domestic uses to solve the problem of liquid electrolyte flammability, i.e., the sole drawback of the lithium secondary battery.

The object of the present lithium secondary battery is to solve such a problem.

The present lithium secondary battery is characterized by comprising a non-aqueous liquid electrolyte having an electric conductivity of 0.05 mS/cm or more and no such a flash point as specified by the JIS-K2265 flash point test.

The present lithium secondary battery is characterized by comprising a lithium-storable and releasable negative electrode, a lithium-storable and releasable positive electrode, a separator and a lithium salt-containing non-aqueous liquid electrolyte, the non-aqueous liquid electrolyte comprising a mixed solution of an ion nonconductive solvent, preferably a non-flammable solvent having a very high flame retardancy, and a lithium ion conductive solvent, the non-aqueous liquid electrolyte having no such a flash point as specified by JIS-K2265 flash point test. The non-aqueous liquid electrolyte can be made to have no such a flash point as specified by JIS-K2265 flash point test by making a ratio of the ion nonconductive solvent to the lithium ion conductive solvent to be 95–60% by volume: 5–40% by volume.

The present lithium secondary battery is characterized in that the non-aqueous liquid electrolyte contains at least 10% by volume of the ion nonconductive solvent and the lithium ion conductive solvent in total.

The present lithium secondary battery is characterized in that the non-aqueous liquid electrolyte comprises a mixed solution of an ion nonconductive solvent and a lithium ion conductive solvent and has an electrical conductivity of 01 to 3 mS/cm.

The present lithium secondary battery is characterized in that the non-aqueous liquid electrolyte comprises a mixed solution of an ion nonconductive solvent and a lithium ion conductive solvent and the lithium ion conductive solvent has a dipole moment of not more than 3 debyes.

The present lithium secondary battery is characterized in that the non-aqueous liquid electrolyte comprises a mixed solution of an ion nonconductive solvent and a lithium ion conductive solvent and the lithium ion conductive solvent comprises a solvent having a dipole moment of less than 3 debyes and a solvent having a dipole moment of not less than 3 debyes.

The present lithium secondary battery is characterized in that the non-aqueous liquid electrolyte comprises an ion nonconductive solvent and a lithium ion conductive solvent, and further contains an organic lithium salt and an inorganic lithium salt as lithium salts.

A non-aqueous liquid electrolyte for the present lithium secondary battery comprises an ion nonconductive solvent and a lithium ion conductive solvent and has an electrical conductivity of 0.1 mS/cm or more and no such a flash point as specified by JIS-K2265 flash point test.

In the following description, the ion nonconductive solvent according to the present invention will be hereinafter referred to "non-flammable solvent".

The non-flammable solvent fails to dissolve a lithium salt, but can be mixed in a compatible or dispersed state, up to a limit value corresponding to the physical properties of the non-flammable solvent, with an ion conductive solution, which comprises a non-aqueous solvent having a low dipole moment and a dissolved and dissociated lithium salt. The present inventors have found that the resulting mixed solution can act as a liquid electrolyte.

In the following description, the liquid electrolyte according to the present invention will be hereinafter referred to as "an non-flammable liquid electrolyte".

The present non-flammable liquid electrolyte is a solution comprising an ion nonconductive solvent such as a fluorinated solvent and a dissolved and dissociated lithium salt-containing non-aqueous solvent having a dipole moment of not more than 3 debyes in a compatible or dispersed state in the ion nonconductive solvent. A lithium secondary battery having a very high safety can be provided by using the present non-flammable liquid electrolyte.

One example of the fluorinated solvent for use in the present invention includes a fluorinated ether represented by the following general formula (1):

$$C_mF_{2m+1}\text{—}O\text{—}C_nH_{2n+1} \quad (1)$$

where m is an integer of 2 to 8, n is an integer of 1 to 5; and m and n is in such a relation as $m \geq ((6n+1)/4)$. These ion nonconductive solvents have a dipole moment of about 2 debyes as obtained by molecular orbital calculation. The non-aqueous solvent to be mixed with the ion nonconductive solvent from the viewpoint of increasing the compatibility also has a dipole moment of desirably about 2 debyes or less, but suitably up to 3 debyes at most.

In the following description of the present non-flammable liquid electrolyte, the fluorinated solvent will be hereinafter referred to as "non-flammable fluorinated solvent".

The non-flammable fluorinated solvent for use in the present invention is at least one of solvents selected from perfluorobutyl methyl ether, perfluorobutyl ethyl ether, perfluoropentyl methyl ether, perfluoropentyl ethyl ether, perfluoroheptyl methyl ether, perfluoroheptyl ethyl ether, etc., where the first two are particularly preferable.

The non-aqueous solvent for use in the present invention is at least one of non-aqueous solvents selected from dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., and fluorinated oligomers represented by the following general formula (2):

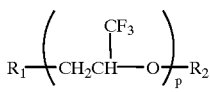

(2)

where p is an integer of 2 to 10, $R_1$ is a hydrogen atom or an alkyl group having 1 to 3 carbon atoms; and $R_2$ is an alkyl group having 1 to 3 carbon atoms, where their dipole moment is preferably not more than 3 debyes. A mixed solution of the fluorinated solvent and the ion conductive non-aqueous solvent form a compatible state.

For lithium salts, at least one of organic lithium salts such as $LiCF_3SO_2$, $LiN(CF_3SO_2)_2$, $LiN(CF_2SO_2)$ $(CF_3CF_2CF_2CF_2SO_2)$, $LiN(CF_3CF_2SO_2)_2$, $LiC(CF_3SO_2)_2$, $LiC(CF_3CF_2SO_2)_2$, $Li[PF_4(CF(CF_3)_2]$ can be used, and at least one of inorganic lithium salts such as $LiPF_6$, $LiBF_4$, LiF, LiBr, LiI, LiCl, LiBr, $LiClO_4$, etc. can be used. Lithium salt, when dissolved into the mixed solution of the non-flammable solvent and the ion conductive, non-aqueous solvent, is dissolved and dissociated by the ion conductive non-aqueous solvent, so that the resulting lithium ions and the counter anions are surround by the solvating ion conductive non-aqueous solvent, resulting in a compatible state in the non-flammable fluorinated solvent. With increasing lithium salt concentration, the ion conductive non-aqueous solvent will be incapable of forming a satisfactory solution zone with lithium ions or counter anions, resulting in contacts of lithium ions or counter anions with the non-flammable solvent, thereby making the energy of the solvent system so unstable that, a larger solvation zone may result through gathering of several solvations, and the non-flammable solvent molecules may form a state free of ion direct contact. Macroscopically, the ion-containing non-aqueous solvent molecules form a micelle-like state in the fluorinated solvent, i.e. a dispersion state of the ion conductive solvent in the ion nonconductive solvent (non-flammable solvent). A mixed solution containing the non-flammable solvent molecules and the lithium salt-dissolved and dissociated non-aqueous solvent molecules in a compatible or dispersed state is utilized as a non-flammable liquid electrolyte. When the lithium salt concentration exceeds a limit value depending on the compatibility of the non-flammable molecules and the non-aqueous solvent molecules, solubilities of lithium salts in non-aqueous solvent, etc., the solution of the non-aqueous solvent containing the lithium salt as dissolved therein will be separated from the non-flammable solvent in the mixed, solution and the mixed solution will no more work as the liquid electrolyte. As the non-flammable solvent, such fluorinated solvents as perfluorobutyl methyl ether and perfluorobutyl ethyl ether are preferable.

For the negative electrode, non-graphitizing carbon, natural or artificial graphite carbon, or tin oxide, silicon or germanium compound, or lithium metal or lithium alloy or the like can be used as an appropriate negative electrode active substance.

For the positive electrode, lithium composite oxides with a transition metal such as cobalt, nickel, manganese, etc., or the lithium composite oxides, part of whose lithium sites or transition metal sites is replaced with cobalt, nickel, manganese, aluminum, boron, magnesium, iron, copper, etc. or iron complex compounds such as ferrocyan blue, berlin green, etc. can be used as an appropriate positive electrode material.

For the separator, a microporous polymer film can be used, and include films of, for example, nylon, cellulose, nitrocellulose, polysulfone, polyacrylonitrile, polyvinylidene fluoride, polypropylene, polyethylene, polybutene, etc.

The battery is not limited to particular shapes, and can take any appropriate shape such as cylindrical shape, a coin shape, a square shape. The battery is also not limited to particular capacities, and can have any appropriate capacity of 5 to 6 Wh for the domestic use to 500 to 600 Wh for the domestic power storage or electric cars.

As a result of further extensive studies of the composition of lithium salt-containing non-aqueous liquid electrolyte to make the liquid electrolyte have no such a flash point as specified by JIS-K2265 flash point test and to improve the load characteristics, the present inventors have found that more preferable effects can be obtained by using the following liquid electrolyte, which comprises:

(a) 60 to 95% by volume of a fluorinated solvent, (b) 5 to 40% by volume of a low dipole moment solvent having a dipole moment of less than 3 debyes obtained by molecular orbital calculation, and (c) 0.1 to 10% by volume of a high dipole moment solvent having a dipole moment of not less than 3 debyes by molecular orbital calculation, and at least one of (d) 0.2 to 1.2 moles/l of an organic lithium salt and (e) 0.005 to 0.5 moles/l of an inorganic lithium salt, the liquid electrolyte having particularly no such a flash point as specified by JIS-K2265 flash point test.

The fluorinated solvent (a) for use in the present invention includes methyl perfluoroalkyl ethers represented by the following general formula (1'):

(1')

where n is an integer of 4 to 12.

As the low dipole moment solvent (b) having a dipole moment of less than 3 debyes, at least one of such linear solvents as dimethyl carbonate (DMC), ethyl methyl carbonate (EMC), diethyl carbonate (DEC), methyl propyl carbonate (MPC), methyl trifluoroethyl carbonate (MTFEC), diglyme (DGM), dimethoxyethane (DME) and triglyme (TGM) can be used.

As a high dipole moment solvent having a dipole moment of not less than 3, at least one of such solvents as ethylene carbonate (EC), propylene carbonate (PC), trifluoropropylene carbonate (TFPC), chloroethylene carbonate (ClEC), vinylene carbonate (VC), butylene carbonate (BC), dimethylvinylene carbonate (DMVC) and γ-butyrolactone (GBL) can be used.

As the organic lithium salt, those mentioned before can be used. As the inorganic lithium salt, those mentioned before can be also used.

According to the present invention, a lithium secondary battery using a non-flammable liquid electrolyte comprising not less than 80% by weight of methyl perfluorobutyl ether as a fluorinated solvent, less than 20% by volume of at least one of dimethyl carbonate, ethyl methyl carbonate and diethyl carbonate as a low dipole moment solvent and 0.1 to 10% by volume of at least one of the above-mentioned compounds as a high dipole moment solvent, and further containing 0.2 to 1.2 moles/l of $LiN(SO_2CF_2CF_3)_2$ as an organic lithium salt and 0.005 to 0.5 moles/l of $LiPF_6$ as an inorganic lithium salt, preferably the liquid electrolyte having no such a flash point as specified by JIS-K2265 flash point test, is preferably provided.

Requirements for the fluorinated solvent for use in a liquid electrolyte are that the solvent is a non-flammable solvent without a flash point, and compatible with a low dipole moment solvent or a high dipole moment solvent. In the present invention, the fluorinated solvent does not require the particular requires lithium salt solubility that is necessary for the ordinary solvent for use in the liquid electrolyte. Thus, various linear fluorinated solvents can be used as non-flammable solvents. Perfluoroalkanes, semifluoroalkanes, their chlorine- or bromine-introduced derivatives, etc. can be also used, though these are not preferable substances when their environmental influence or toxicity is taken into consideration. Hydrofluroethers used as a substitute for flon cleaning agents from the viewpoint of environmental protection have no such problems and are not expensive, as compared with the ordinary solvents for use in the liquid electrolyte, and are rather suitable as a non-flammable solvent for use in the non-flammable liquid electrolyte. That is, methyl perfluoroalkyl ethers represented by the following general formula (1') are preferable fluorinated solvents for use in the present invention:

$$C_nF_{2n+1}-O-CH_3 \tag{1'}$$

where n is an integer of 4 to 12, and include, for example, methyl perfluorobutyl ether, methyl perfluoropentyl ether, methyl perfluorohexyl ether, methyl perfluorobutyl ether, methyl perfluorooctyl ether, methyl perfluorononyl ether, methyl perfluorodecyl ether, methyl perfluoroundecyl ether, methyl perfluorododecyl ether, etc.

Generally, the fluorinated solvent has a low dipole moment. As the first solvent to be mixed with the fluorinated solvent, the linear low dipole moment solvent as mentioned before has a better compatibility.

A mixed solution of the hydrofluoroether and the low dipole moment solvent can dissolve the organic lithium salt up to about 1.2 M even at a concentration of not less than 80% by volume of the fluorinated solvent, though depending on the species and mixing proportion of mixed solution. The soluble organic lithium salts are those mentioned before. Above all, $LiN(SO_2CF_2CF_3)_2$, $LiC(SO_2CF_2CF_3)_3$, $LiC(SO_2CF_3)_3$ and $Li[PF_4(CF(CF_3)_2]$ having a low reactivity with aluminum at high potentials in the current batteries using aluminum as a positive electrode current collector are preferable.

A non-flammable liquid electrolyte can be provided by using the foregoing materials as components, but to improve the load characteristics, it is further necessary to provide a film capable of reducing the lithium ion incoming or outgoing resistance through the boundary surface of active substance when charged or discharged, as called SEI (surface electrode interface) (see, for example, J. Electrochemical Soc., P2882, vol. 142 (1995), etc.). Properties of reaction products in the solvent near the electrode depend on the species of highly reactive compounds present in the liquid electrolyte, the species and mixing proportion of solvents to be mixed to serve as the reaction field for these compounds, etc. It seems that no satisfactory SEI for maintaining the load characteristics can be obtained in the liquid electrolyte comprising the foregoing component materials. To obtain a satisfactory SEI, a high dipole moment solvent having a high coordinatability with lithium ions is further mixed as a precursor for SEI in the present invention. With increasing amount of the high dipole moment solvent, the liquid electrolyte will be no more applicable, because of occurrence of phase separation. Thus, it is preferable to add 0.1 to 10% by volume of the high dipole moment solvent thereto. Furthermore, the load characteristics of the liquid electrolyte can be much more stabilized by adding an inorganic lithium salt having a very low solubility, per se, in the fluorinated solvent or the mixed solution of the fluorinated solvent. The inorganic lithium salt to be added thereto is those mentioned before. Particularly in the case of using an aluminum positive electrode current collector, fluorine-containing compounds capable of forming an electrochemically stable film on the aluminum surface, such as $LiPF_6$, $LiBF_4$ and LiF are preferable. It is preferable to add 0.005 to 0.5 moles/l of the inorganic lithium salt thereto, due to their low solubility.

The present invention also provides an electrical appliance using the present lithium secondary batteries, characterized by comprising a means for protecting overcharging and overdischarging of the lithium secondary batteries, the means being free from temperature and pressure detection of the lithium secondary batteries, a means for detecting the voltage or current of the lithium secondary batteries, and a means for on-off controlling the power source on the basis of detected voltage or current values.

The present invention will be described in detail below, referring to Examples and Comparative

EXAMPLES

Examples 1 to 9 and Comparative Example 1

Tridecafluorobutyl methyl ether HFE 7100 (trademark of a product commercially available from Sumitomo-3M Co., Japan; dipole moment obtained by molecular orbital calculation (MOPAC): 2.37 debyes) as a non-flammable fluorinated solvent, ethyl methyl carbonate (dipole moment likewise obtained: 0.887 debyes) as a non-aqueous solvent and lithium bistrifluoromethyl sulfonyl imide (LiTFMSI) as a lithium salt were used to evaluate relations between lithium salt concentration and ionic conductivity, and also solubility and miscibility of the liquid electrolytes of Examples 1 to 9 and that of Comparative Example 1 in solvent mixing proportions as shown in the following Table 1.

TABLE 1

|  | Non-flammable solvent HFE7100 Mixing proportion (vol. %) | Non-aqueous solvent EMC Mixing proportion (vol. %) |
|---|---|---|
| Example 1 | 85 | 15 |
| Example 2 | 80 | 20 |
| Example 3 | 70 | 30 |
| Example 4 | 60 | 40 |
| Example 5 | 50 | 50 |
| Example 6 | 40 | 60 |
| Example 7 | 30 | 70 |
| Example 8 | 20 | 80 |
| Example 9 | 10 | 90 |
| Comp. Ex. 1 | 0 | 100 |

FIG. 1 is a graph showing relations between lithium salt concentration and changes in ionic conductivity. As is obvious from FIG. 1, the ionic conductivity increases with increasing EMC mixing proportion, and above 50 vol. % of EMC mixing proportion the ionic conductivity no more decreases even at a lithium salt concentration over 1 M (mole/liter), showing that LiTFSI can be much more dissolved. In these Examples 1 to 9 and Comparative Example 1, dispersion or 10 separation of the non-aqueous solvent in or from the fluorinated solvent is not observable in the evaluated lithium salt concentration range. That is, the liquid electrolytes consisting of HFE7100 and EMC can be kept in a compatible state in substantially all mixing proportions, and a satisfactory ionic conductivity (=about one-third of the ionic conductivity of Comp. Ex. 1 liquid electrolyte using a single EMC non-aqueous solvent at 0.95 M lithium salt concentration) can be obtained even in mixing proportions of 40 vol. % or more of HFE7100, which are in a preferable mixing range for the high non-flammability.

Examples 10 to 14 and Comparative Examples 2 to 5

A mixing proportion of non-flammable fluorinated solvent HFE7100 was kept constant at 80 vol. % and that of non-aqueous solvent was kept constant at 20 vol. %, while changing the species of the non-aqueous solvent as shown in the following Table 2. Results of evaluation are also shown in the same Table 2.

TABLE 2

|  | Non-aqueous solvent | Dipole moment of non-aqueous solvent (Debyes) | Solvent compatibility | State of liquid electrolyte | Ionic conductivity (mS/cm) | LiTFSI concentration (M) |
| --- | --- | --- | --- | --- | --- | --- |
| Example 10 | DMC | 0.759 | Compatible | Compatible | 0.84 | 1 |
| Example 11 | DEC | 0.967 | Compatible | Compatible | 0.68 | 0.8 |
| Example 12 | TFEMC | 2.231 | Compatible | Compatible | 0.25 | 0.6 |
| Example 13 | BTFPC | 2.719 | Compatible | Compatible | 0.15 | 0.3 |
| Example 14 | DOL | 1.256 | Compatible | Separated | 0.05 | 0.2 |
| Comp. Ex. 2 | PC | 4.811 | Separated | Separated | Unmeasurable | Unpreparable |
| Comp. Ex. 3 | EC | 4.616 | Separated | Separated | Unmeasurable | Unpreparable |
| Comp. Ex. 4 | GBL | 4.228 | Separated | Separated | Unmeasurable | Unpreparable |
| Comp. Ex. 5 | BC | 5.009 | Separated | Separated | Unmeasurable | Unpreparable |

As shown in Table 2, solvent compatibility and miscible state and ionic conductivity of liquid electrolytes of Examples 10 to 14 and Comparative Examples 2 to 5 were evaluated, where DMC stands for dimethyl carbonate, DEC for diethyl carbonate, TFEMC for trifluoroethyl methyl carbonate, BTFPC for bistrifluoropropyl carbonate, DOL for 1,3-dioxolan, PC for propylene carbonate, EC for ethylene carbonate, GBL for γ-butyrolactone, and BC for butylene carbonate.

As is obvious from Table 2, solvents having a higher dipole moment than 3 debyes of Comparative Examples 2 to 5, i.e. PC, EC, GBL and BC are not compatible with the non-flammable solvent HFE7100. It seems therefrom that the compatibility largely depends on differences in the solvent polarity. It is also noted that a solvent of cyclic molecules, even if the dipole moment is lower than 3 debyes, for example, DOL (1.256 debyes), takes a dispersed state, when mixed with the non-flammable solvent. Even solvents of linear molecules have a decreasing lithium salt solubility with increasing dipole moment such as BTEPC (2.719 debyes). It can be seen from the foregoing that the solvent to be mixed with the non-flammable fluorinated solvent preferably have a dipole moment of not more than 3 debyes.

Examples 15 to 18

Figure 2:
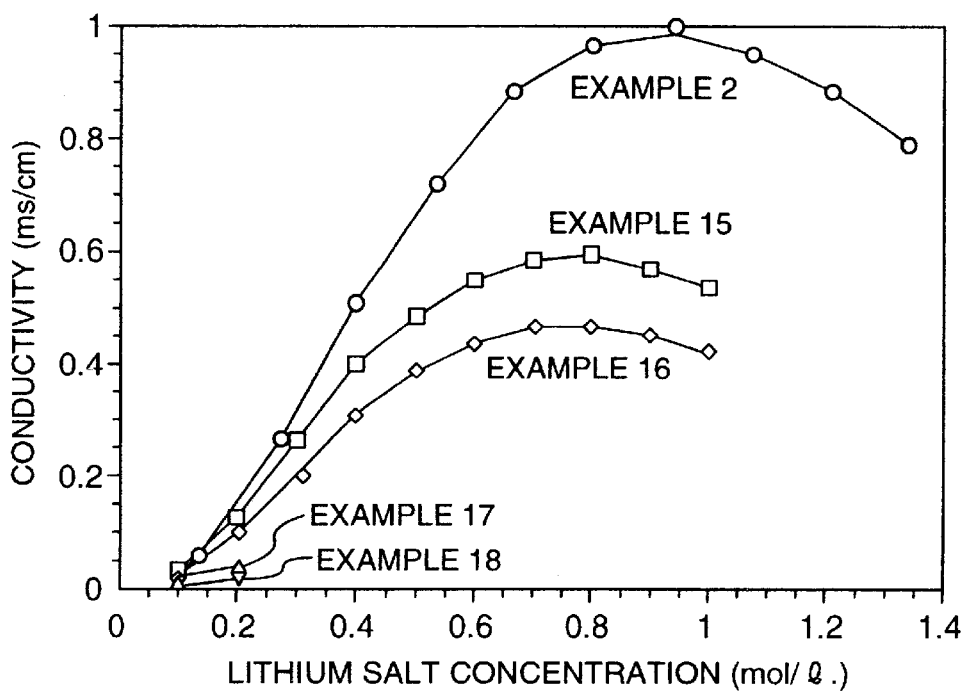
FIG. 2 is a graph showing relations between lithium salt species, their salt concentration and conductivity of non-flammable electrolytes according to embodiments of the present invention.

FIG. 2 is a graph showing relations between lithium salt concentrations in relation to solubility dependency of various lithium salts in a mixed solution of 80 vol. % HFE7100 and 20 vol. % MEC and ionic conductivity of the resulting liquid electrolytes. As lithium salts, lithium bispentafluoroethyl sulfonyl imide (LiBETI), a product commercially available from Sumitomo-3M Co., Japan), was used in Example 15, lithium perfluorobutylmethylsulfonyl imide (LiFBMSI), a product commercially available from Central Glass Co., Japan, in Example 16, lithium hexafluorophosphate (LiPF$_6$) in Example 17 and lithium tetrafluoroborate (LiBF$_4$) in Example 18. In FIG. 2 plot discontinuity in some curves means measurement failures due to separation of the non-aqueous solvent from the non-flammable fluorinated solvent in the liquid electrolyte.

As shown in FIG. 2, organic lithium salts having a fluoro chain such as LiTFSI, LiBETI, LiFBMSI, etc. have higher solubility and dissociability and also a better electrical conductivity in the mixed solution than inorganic lithium salts such as LiPF$_6$, LiBF$_4$, etc., because it seems that the anions dissociated from the inorganic lithium salt have a higher orientativeness and substantially zero dipole moment (e.g. 0.001 debye with PF$_6^-$ and 0.001 debye with BF$_4^-$ as calculated), and also have so small a molecular radius that their affinities toward the non-flammable fluorinated solvent having a high electrificability and a low dielectric constant are lowered.

On the other hand, anions dissociated from the organic lithium salts have a significant dipole moment (1.23 debyes with TFSI$^-$, 1.103 debyes with BETI$^-$ and 8.468 debyes with FBMSI$^-$ as calculated) and a larger molecular radius. The organic anions shown herein have a fluoro chain and a good affinity toward the non-flammable fluorinated solvent, contributing to the higher solubility. That is, organic lithium salts are more preferable electrolyte materials for the non-flammable liquid electrolyte. Above all, LiTFSI having a shorter fluoro chain has a better counter anion diffusibility and is a distinguished electrolyte material for the non-flammable liquid electrolyte.

Examples 19 to 23 and Comparative Example 6

Lithium secondary batteries of Examples 19 to 23 using non-flammable liquid electrolytes of various compositions shown in the following Table 3 and a lithium secondary battery of Comparative Example 6 using the conventional liquid electrolytes shown in the same Table 3 were prepared to evaluate battery characteristics and safety. The results are also shown in Table 3, where HFE7200 is tridecafluorobutyl ethyl ether, a product commercially available from Sumitomo-3M Co., Japan.

TABLE 3

|  | Solvent mixing proportion (vol. %) | Lithium salt | Initial capacity (mAh) | Capacity maintenance rate (%) | Safety test 1 | Safety test 2 |
| --- | --- | --- | --- | --- | --- | --- |
| Example 19 | HFE7100:EMC = 80:20 | LiTFSI | 1290 | 92 | No ignition | No ignition |
| Example 20 | HFE7200:EMC = 80:20 | LiTFSI | 1270 | 94 | No ignition | No ignition |
| Example 21 | HFE7100:EMC = 80:20 | LiBETI | 1280 | 93 | No ignition | No ignition |
| Example 22 | HFE7200:EMC = 80:20 | LiBETI | 1270 | 94 | No ignition | No ignition |

TABLE 3-continued

|  | Solvent mixing proportion (vol. %) | Lithium salt | Initial capacity (mAh) | Capacity maintenance rate (%) | Safety test 1 | Safety test 2 |
|---|---|---|---|---|---|---|
| Example 23 | HFE7100:DMC = 80:20 | LiTFSI | 1300 | 91 | No ignition | No ignition |
| Comp. Ex. 6 | EC:EMC = 30:70 | LiPF$_6$ | 1300 | 95 | Ignited | Ignited |

Figure 3:
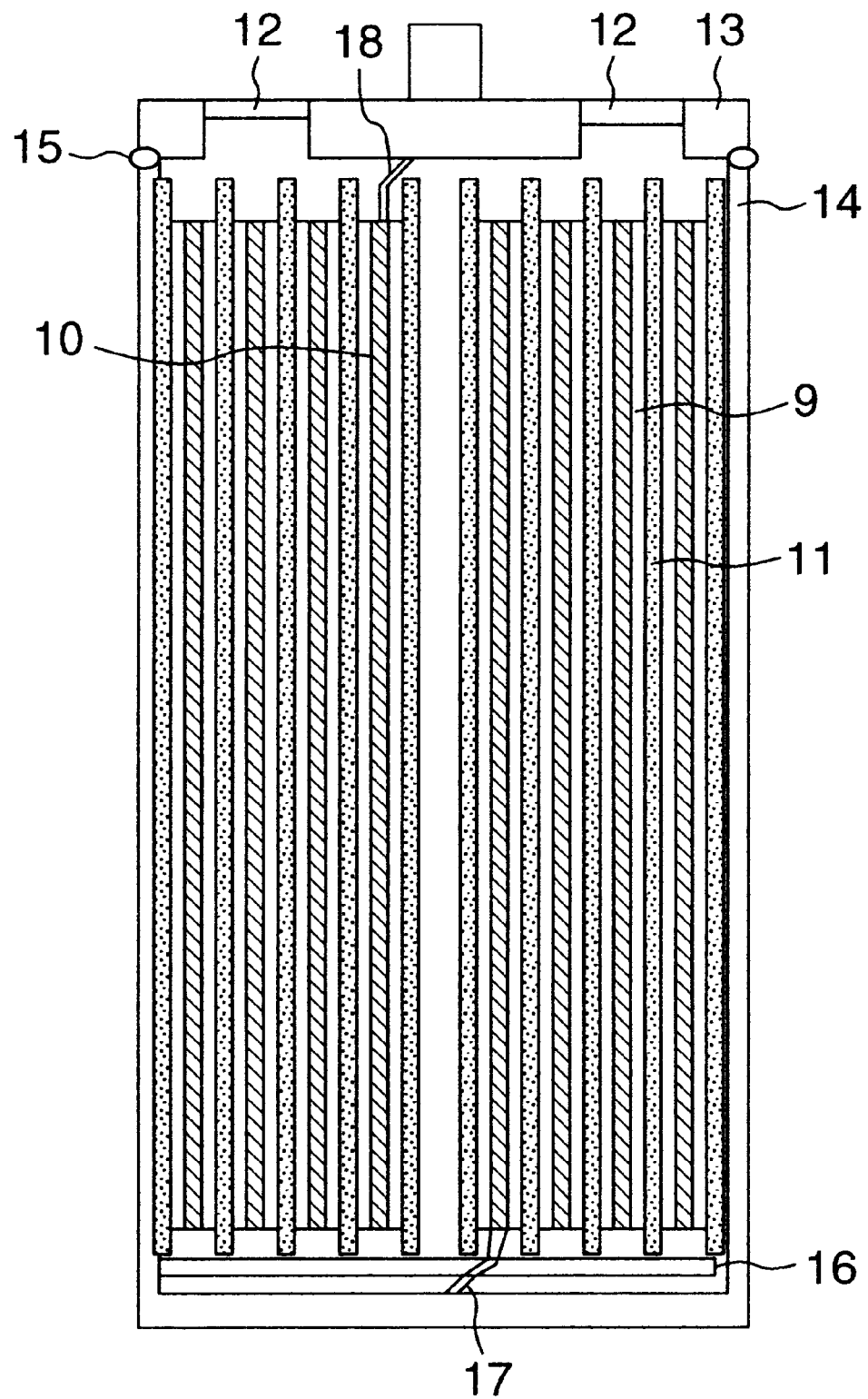
FIG. 3 is a vertical cross-sectional view of a cylindrical battery as given in Examples 19 to 23.

FIG. 3 is a vertical cross-sectional view of a cylindrical battery, 18 mm in outer shell diameter and 65 mm high, as used in these Examples and Comparative Example, where artificial graphite was used for negative electrode active substance 9, lithium cobaltate for positive electrode active substance 10, and 25 μm-thick microporous polyethylene film for separator 11. The battery was prepared by introducing the liquid electrolyte therein by vacuum impregnation in a glove box, then providing thereon battery positive electrode cover 13 with two internal pressure release valves, whose pressure limit was 5 atmospheres, and tightly sealing the cover to battery can 14 by laser welding (welding seam: 15).

For positive electrode 10, a slurry of positive electrode mixture was prepared by adding 7 parts by weight of acetylene black as a conductor and 5 parts by weight of polyvinylidene fluoride (PVDF) as a binder to 100 parts by weight LiCoO$_2$ as a positive electrode active substance, and further adding N-methyl-2-pyrrolidone thereto, followed by mixing.

For negative electrode 9, a slurry of negative electrode mixture was likewise prepared by adding 10 parts by weight of PVDF as a binder to 100 parts by weight graphite powder, 8 μm in average particle size, comprising 1 to 20 wt. % of rhombohedral crystal, the balance being hexagonal crystal as a negative electrode active substance and further adding N-methyl-2-pyrrolidone, followed by mixing.

Then, the positive electrode mixture was applied to both sides of a 20 μm-thick aluminum foil and vacuum dried at 120° C. for one hour. After the vacuum drying, a positive electrode having a thickness of 195 μm was press molded therefrom by a roller press. The amount of the applied mixture per unit area was 55 mg/cm$^2$.

On the other hand, the negative electrode mixture was applied to both sides of a 10 μm-thick copper foil and vacuum dried at 120° C. for one hour. After the vacuum drying, a negative electrode having a thickness of 175 μm was press molded by a roller press. The amount of the applied mixture per unit area was 25 mg/cm$^2$. Proportion of rhombohedral crystal in the graphite powders can be adjusted by heat treatment at 900° C. or higher, and a smaller proportion thereof is preferable.

The thus obtained positive electrode 10, separator 11, the thus obtained negative electrode 9 and separator 11 were laid one upon another in this sequence, followed by winding of the resulting laminate, and the wound laminate was inserted into battery can 14, where numeral 16 is an insulating plate, 17 a negative electrode lead and 18 a positive electrode lead.

For battery can 14 and battery positive electrode cover 13, JIS SUS 304 or 316 austenite stainless steel was used.

Since the initial capacity of Comparative Example 6 was 1,300 mAh, the charge-discharge cycle test of the respective batteries was carried out at a rate of 0.5C (650 mA) up to 300 cycles on the basis of the initial capacity of Comparative Example 6. As safety tests, Safety Test 1 of directly heating the longitudinal midpoint of a fully charged battery in a laid-down position by a gas burner and Safety Test 2 of driving a nail, 5 mm in diameter, into the longitudinal midpoint of the battery down to the half of the battery diameter. As shown in Table 3, the batteries of Examples 19 to 23, using the present non-flammable liquid electrolyte are characteristically comparable with the battery of Comparative Example 6 using the conventional liquid electrolyte (initial capacities of 1,200 mAh or higher and capacity maintenance rate of 90% or higher), and have a much improved safety because of being quite free from any risk of ignition.

Examples 24 to 28 and Comparative Example 7

Figure 4:
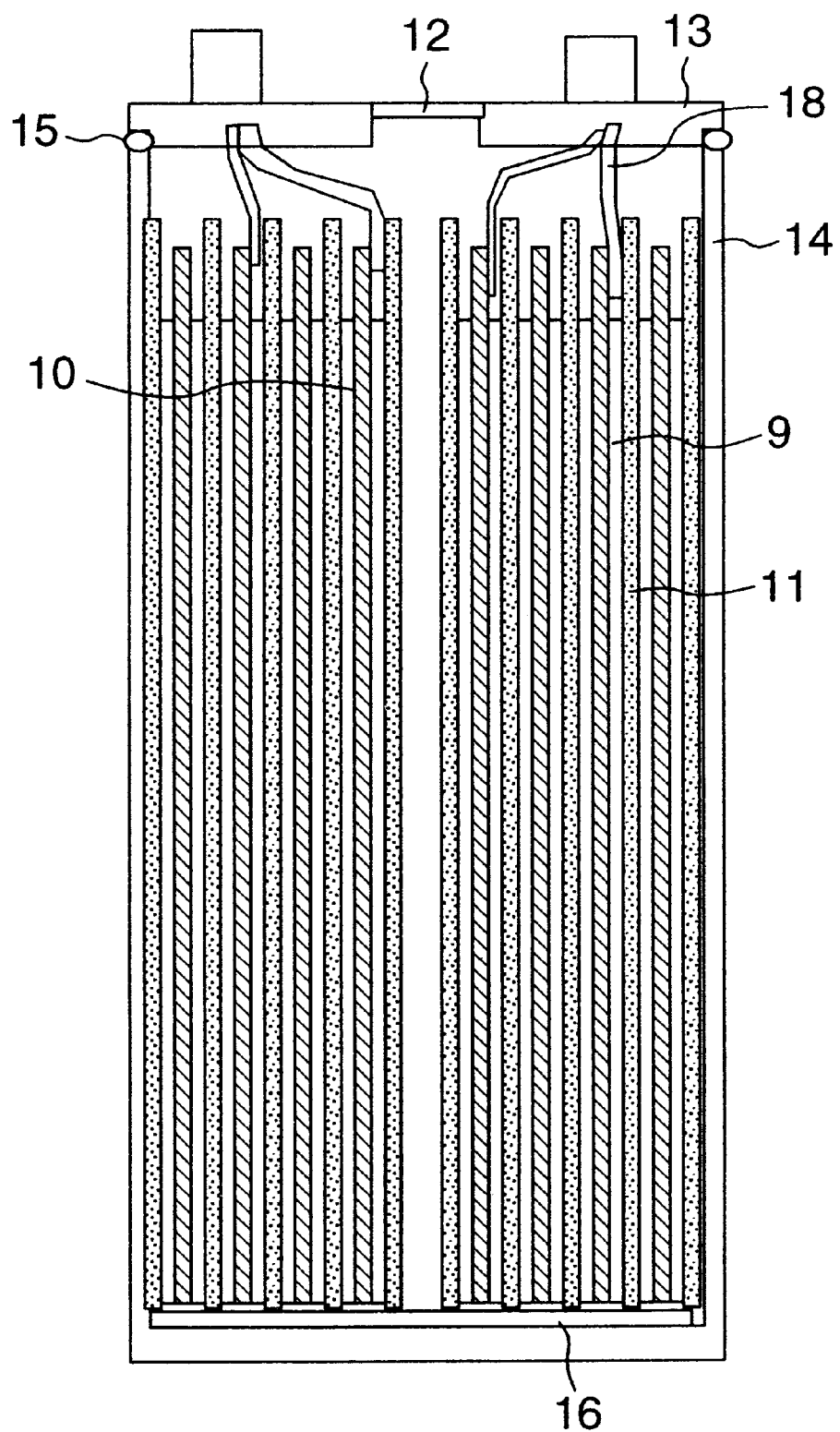
FIG. 4 is a vertical cross-sectional view of a large capacity, cylindrical battery, as given in Examples 24 to 28.

Large capacity lithium secondary batteries of cylindrical structure, 80 mm in diameter and 240 mm high, of Examples 24 to 28 and Comparative Example 7, as shown in FIG. 4 were prepared by using non-flammable liquid electrolytes of various compositions of Examples 24 to 28 and liquid electrolyte of Comparative Example 7 as shown in the following Table 4, lithium manganate for positive electrode, amorphous graphite for negative electrode, and a 40 μm-thick polyethylene film for separator to evaluate the battery characteristics and safety likewise. Results of evaluation are shown in the same Table 4.

TABLE 4

|  | Solvent mixing proportion (vol. %) | Lithium salt | Initial capacity (Ah) | Capacity maintenance rate (%) | Safety test 1 | Safety test 2 |
|---|---|---|---|---|---|---|
| Example 24 | HFE7100:EMC = 80:20 | LiTFSI | 26.5 | 98 | No ignition | Solvent evaporation |
| Example 25 | HFE7200:EMC = 80:20 | LiTFSI | 26.3 | 97 | No ignition | Solvent evaporation |
| Example 26 | HFE7100:EMC = 80:20 | LiBETI | 26.3 | 98 | No ignition | Solvent evaporation |
| Example 27 | HFE7200:EMC = 80:20 | LiBETI | 26.2 | 97 | No ignition | Solvent evaporation |

TABLE 4-continued

|  | Solvent mixing proportion (vol. %) | Lithium salt | Initial capacity (Ah) | Capacity maintenance rate (%) | Safety test 1 | Safety test 2 |
|---|---|---|---|---|---|---|
| Example 28 | HFE7100:DMC = 80:20 | LiTFSI | 26.9 | 97 | No ignition | Solvent evaporation |
| Comp. Ex. 7 | EC:EMC = 30:70 | $LiPF_6$ | 27 | 99 | Considerably ignited | Considerable smoke generation |

Negative electrode 9, positive electrode 10, battery can 14 and battery positive electrode cover of the battery were made from the same materials as used in Examples 19 to 23. The battery positive electrode cover 13 was provided with an internal pressure release valve 12, whose pressure limit was 5 atmospheres, and was tightly sealed to battery can 14 by laser welding (welding seam: 15).

Initial capacities of batteries of Examples 24 to 28 of the present invention ranged from 26 to 27 Ah, whereas that of Comparative Example 7 was 27 Ah. Battery characteristics were determined by carrying out 300 cycles of charge-discharge test at a current rate of 10A. The resulting capacity maintenance rate was 97% or higher. The large capacity batteries each contained about 100 ml of liquid electrolyte. In Safety Test 2, battery temperature was abruptly elevated for an instant due to short circuits within the battery, where the conventional liquid electrolyte suffered from smoke generation, whereas it seems that the main component of the present non-flammable liquid electrolytes, i.e. fluorinated solvent (substantially non-toxic with a low global warning coefficient) was dissipated by evaporation without any observation of heavy smoke generation. That is, with the present non-flammable liquid electrolyte, even a large capacity secondary battery can give equivalent battery characteristics to those of the battery using the conventional liquid electrolyte, and the safety, which is particularly important in the large capacity secondary battery, can be drastically improved.

As described above, the present non-aqueous, non-flammable liquid electrolyte has good battery characteristics such as battery capacity and load characteristics, even though its ionic conductivity is low, as compared with the conventional non-aqueous liquid electrolyte. This suggests that the ion migration route formed by the ion conductive, non-aqueous solvent mixed with the non-flammable fluorinated solvent is not interfered. In other words, even in the conventional non-aqueous liquid electrolyte ions migrate through narrow pores in the separator, and it seems that the non-flammable solvent acts likewise, i.e. like a so-called liquid separator. Furthermore, it seems that the ion concentration in the ion migration route is higher than in the conventional non-aqueous liquid electrolyte and thus a liquid electrolyte system of much higher efficiency has been established in the present invention than the conventional system.

Example 29

Figure 5:
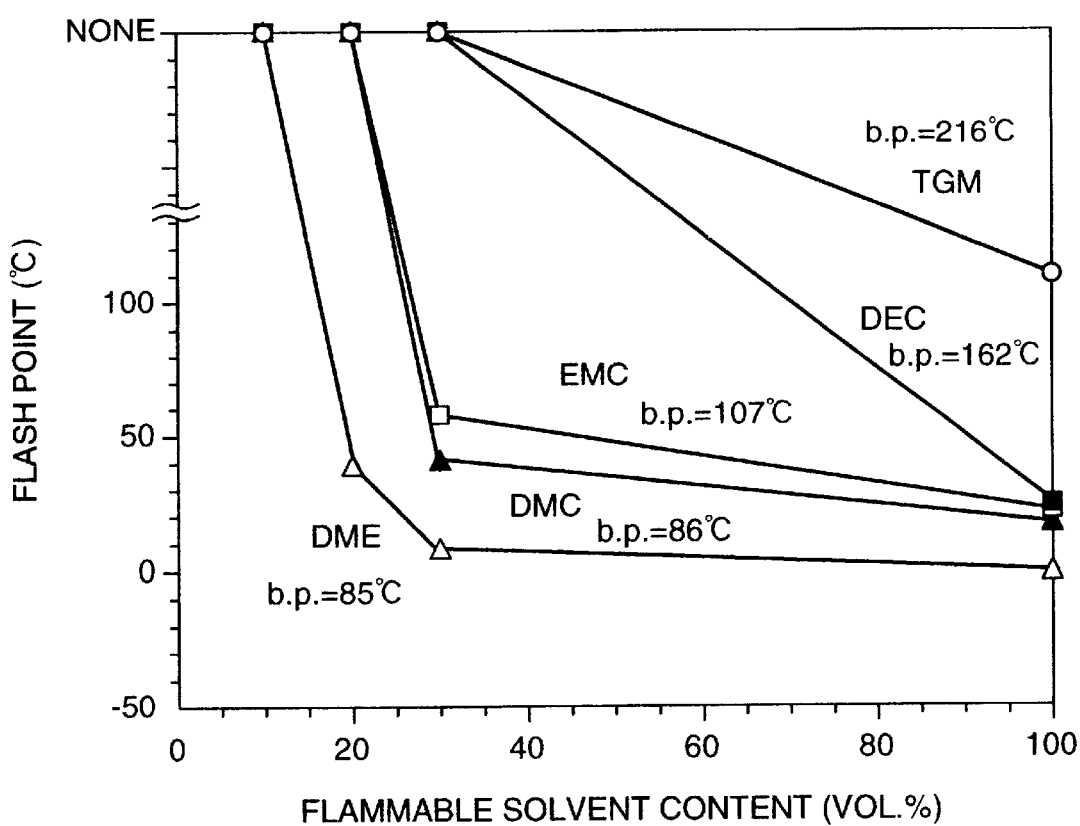
FIG. 5 is a graph showing relations between flammable solvent contents and flash points.

FIG. 5 is a graph showing relations between the contents of various ion conductive solvents mentioned before and the flash point according to JIS-K2265 flash point test, where the non-flammable solvent was HFE7100. As shown in FIG. 5, the contents showing no such a flash point as specified by JIS-K2265 flash point test depended on the species of solvents, where B.P. stands for boiling point. Less than 30% by volume of EMC and DMC and less than 20% by volume of DME are preferable. Not more than 30% by volume of TGM and DEC are preferable.

Example 30

Figure 6:
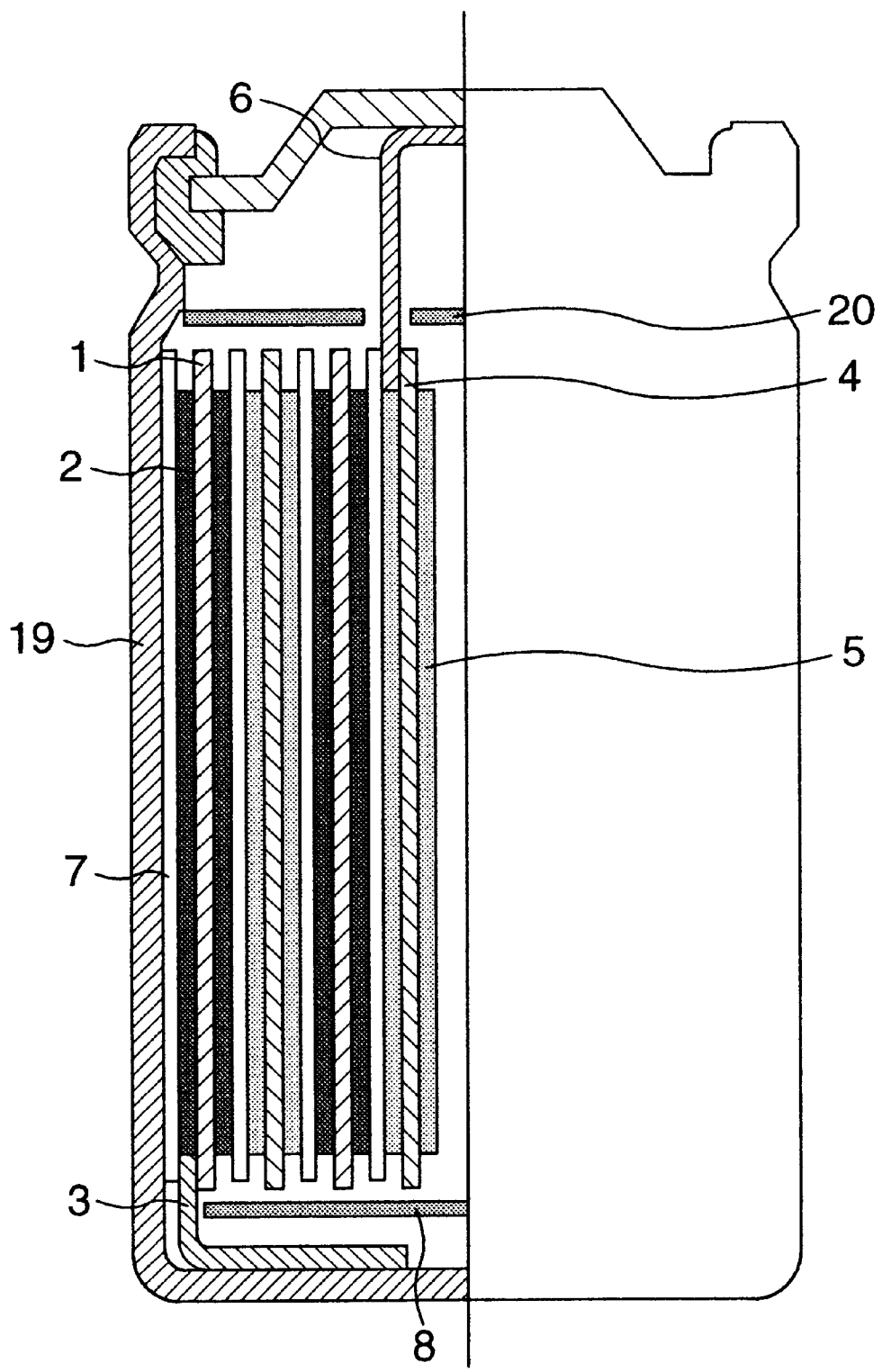
FIG. 6 is a vertical cross-sectional view of a cylindrical battery, as given in Example 30.

FIG. 6 is a partially cutaway view showing a cylindrical lithium secondary battery, 18 mm in diameter and 65 mm high, using the present non-aqueous liquid electrolyte.

A paste of negative electrode mixture was prepared by dissolving and kneading 90 parts by weight of graphite carbon materials as a negative electrode active substance into N-methyl-pyrrolidone together with 10 parts by weight of polyvinylidene fluoride (PVDF) as a binder. The paste of negative electrode mixture was applied to both sides of a 10 μm-thick copper foil current collector 1, dried by heating and press heated to make negative electrode 2. Then, negative electrode tab terminal 3 was fixed to one end of the electrode by welding a nickel foil thereto.

A paste of positive electrode mixture was prepared by dissolving and kneading 80 parts by weight of $LiCoO_2$ as a positive active substance, 8 parts by weight of acetylene black as a conducting promoter, 7 parts by weight of PVDF into N-methylpyrrolidone. The paste of positive electrode mixture was applied to both sides of a 20 μm-thick aluminum foil current collector 4, dried by heating and press heating to make positive electrode 5. Positive electrode tab terminal 6 was fixed to one end of the electrode by welding a nickel foil thereto.

Porous polypropylene separator 7 was sandwiched between these electrodes, followed by winding, thereby forming an electrode laminate. Then, the electrode laminate was inserted into battery can 19, while sandwiching negative electrode insulator 8 between the electrode laminate and the can bottom, and negative electrode tab terminal 3 was welded to the can bottom. Positive electrode tab terminal 6 was welded to positive electrode cover 20 through positive electrode insulator 21.

83 vol. % of methyl perfluorobutyl ether as a fluorinated solvent and 15 vol. % of EMC were mixed together, and further 0.8 moles/t of $LiN(So_2CF_2CF_3)_2$ as a lithium salt was added thereto. Then, 2 vol. % of EC was dissolved into the resulting solution, and further 0.1 mole/l of $LiPF_6$ as an inorganic lithium salt was dissolved therein to prepare liquid electrolyte A. It was found by JIS-K2265 Cleveland open-cup flash point test that the liquid electrolyte A had no such a flash point as specified in the JIS-K2265 flash point test.

Finally, the liquid electrolyte A was introduced into the battery made ready as above by vacuum impregnation, and then positive electrode cover 20 and battery can 19 were tightly sealed together by caulking to prepare a battery A.

Comparative Example 8

A lithium secondary battery R1 was prepared, using a solvent solution comprising 34 vol. % of EC and 66 vol. % of DMC and further containing 1.0 M LiPF$_6$ as dissolved therein as a liquid electrolyte R1. It was found by the JIS-K2265 flash point test that the liquid electrolyte R1 had a flash point of about 35° C.

Comparative Example 9

A liquid electrolyte B was prepared by mixing 85 vol. % of methyl perfluorobutyl ether as a fluorinated solvent with 15 vol. % of EMC, followed by dissolving 0.8 moles/l of LiN(SO$_2$CF$_2$CF$_3$)$_2$ as a lithium salt therein. The liquid electrolyte B was introduced into the same battery as in Example 30 to prepare a lithium secondary battery R2. The liquid electrolyte B had the same composition as that of liquid electrolyte A except that neither EC nor LiPF$_6$ were contained therein. It was found by the JIS-K2265 flash point test that the liquid electrolyte B had no such a flash point as specified therein.

Evaluation of Load Characteristics

Figure 7:
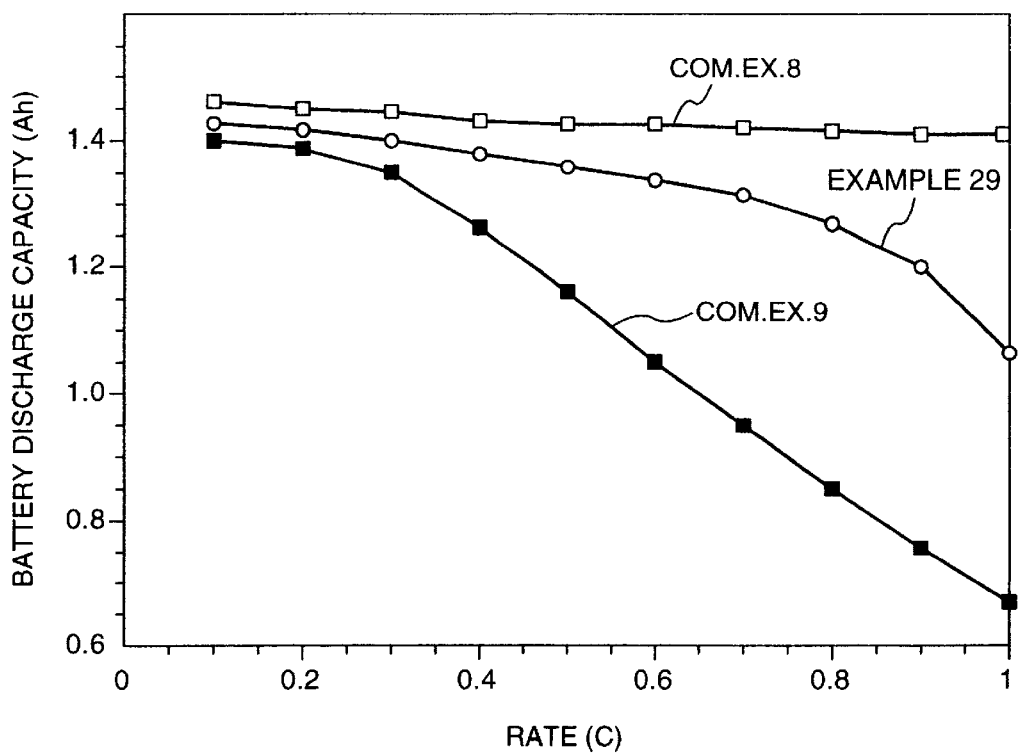
FIG. 7 is a graph showing load characteristics of the cylindrical battery, as shown in FIG. 6.
Figure 8:
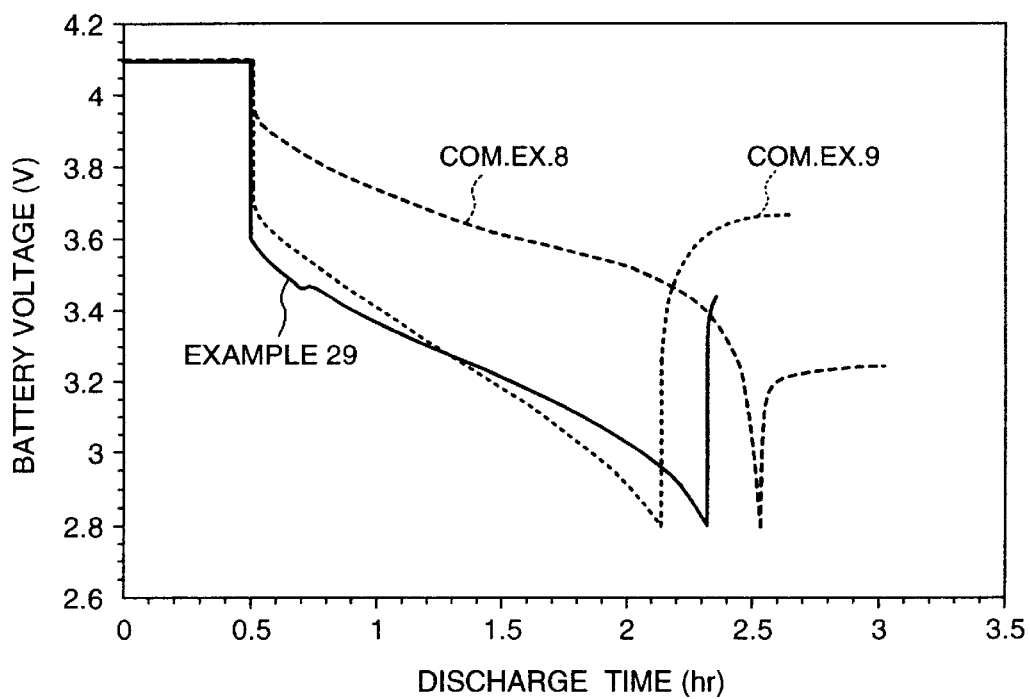
FIG. 8 is a graph showing comparison of discharge-voltage curves in the high current level discharge of the cylindrical battery is shown in FIG. 6.

Load characteristics of the batteries prepared in the foregoing manner were evaluated on the basis of 140 mA as 0.1C (10-hour rate) by increasing a current from 140 mA up to 1,400 mA (IC) successively at a rate of 140 mA. Charging conditions were constant-current and constant-voltage (CC-CV) conditions by increasing the current of constant-current from 140 mA up to 1,400 mA successively at a rate of 140 mA as mentioned above, and the voltage for constant-voltage charging was set to 4.1 V with the end point being set to 15 hours or not more than 10 mA. Results of the test are shown in FIG. 7. In contrast to the load characteristics of battery R1 using the conventional liquid electrolyte R1, the discharge capacity of battery R2 using the non-flammable liquid electrolyte B is considerably lowered at the current of 0.3C (420 mA) or more. On the other hand, the present battery A using the non-flammable liquid electrolyte A containing both EC and LiPF$_6$ has a drastically higher discharge capacity than that of battery R2, though a little inferior to that of battery R1. However, the drastically higher discharge capacity is surprising, when the ionic conductivities of these liquid electrolytes are taken into consideration. For example, 0.7 mS/cm for liquid electrolyte A, 12 mS/cm for liquid electrolyte RI and 0.45 mS/cm for liquid electrolyte R2. Thus, discharge curves at 0.5C of these batteries were compared, as shown in FIG. 8. As is obvious from FIG. 8, battery A of Example 30 shows a smaller voltage decrease at the end of discharge than battery R2. Successful control of voltage decrease and a cause for improving the load characteristics of liquid electrolyte A are due to the effect of addition of EC and LiPF$_6$. The voltage decrease seems to be due to adsorption of solvent molecules at the electrode boundaries or a decrease in diffusibility of anions or lithium ions, but addition of EC and LiPF$_6$ seems to lessen these troubles.

Effect of High Dipole Moment Solvent

Effect of addition of high dipole moment solvent was evaluated by changing the species of high dipole moment solvent.

Figure 9:
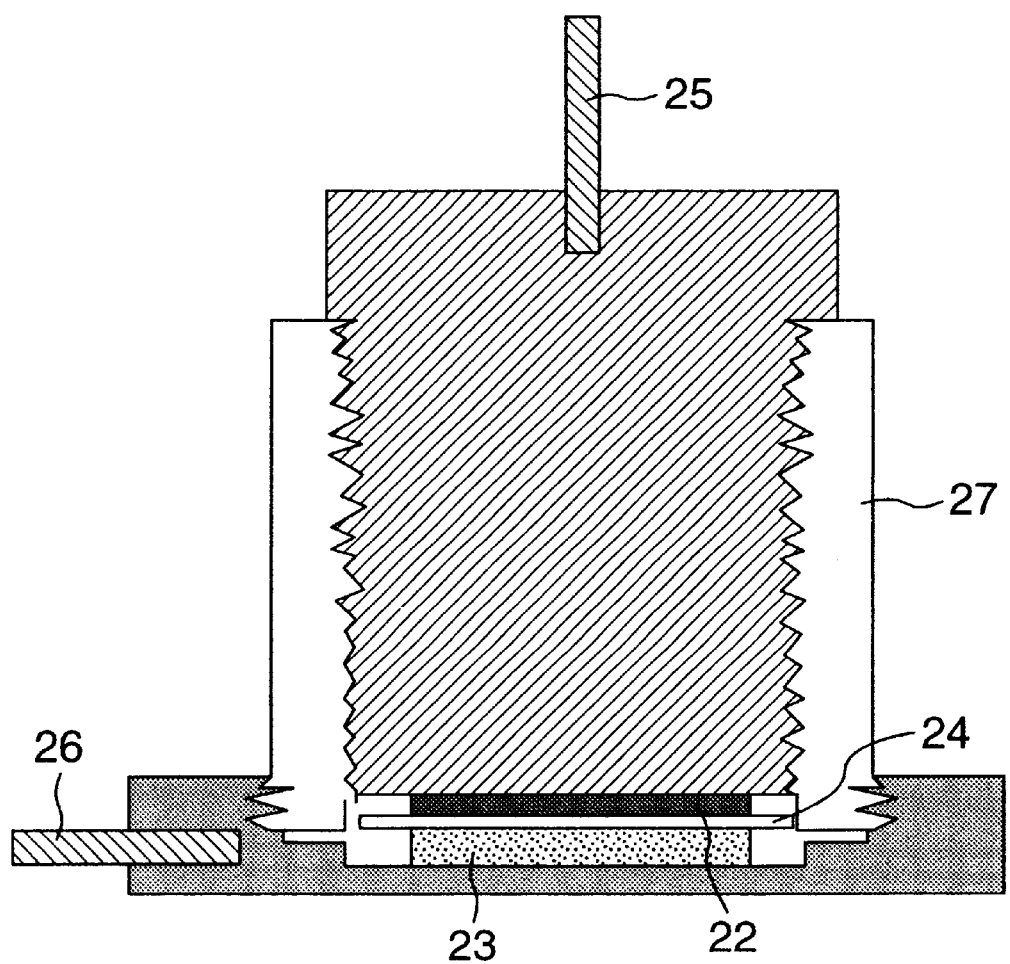
FIG. 9 is a vertical cross-sectional view of a test battery.

Disk electrodes, 15 mm in diameter, were coated with the same positive electrode material and negative electrode materials as used in Example 30, on their one side, respectively, to make disk positive electrode 23 and disk negative electrode 22, and thus coated disk electrodes were made into a test battery as shown in FIG. 9, using a disk separator 24, 18 mm in diameter, to evaluate battery characteristics.

In FIG. 9, numeral 25 is a negative electrode terminal, 26 a positive electrode terminal and 27 a Teflon fastening screw.

Example 31

A test battery C1 was prepared, using a liquid electrolyte C prepared by adding 0.05 g/l at PC (propylene carbonate) to liquid electrolyte B. That is, the liquid electrolyte C comprised 83 vol. % of methyl perfluorobutyl ether, 15 vol. % of EMC and 2 vol. % of PC.

Example 32

A test battery C2 was prepared, using a liquid electrolyte D prepared by replacing PC with the same amount of BC (butylene carbonate) in the liquid electrolyte C. That is, the liquid electrolyte D comprised 83 vol. % of methyl perfluorobutyl ether, 15 vol. % of EMC and 2 vol. % of BC.

Example 33

A test battery C4 was prepared, using a liquid electrolyte F prepared by replacing PC with the same amount of TFPC (trifluoromethylpropylene carbonate) in the liquid electrolyte C. That is, the liquid electrolyte F comprised 83 vol. % of methyl perfluorobutyl ether, 15 vol. % of EMC and 2 vol. % of TFPC.

Comparative Example 10

A test battery RC1 was prepared, using the liquid electrolyte B.

Figure 10:
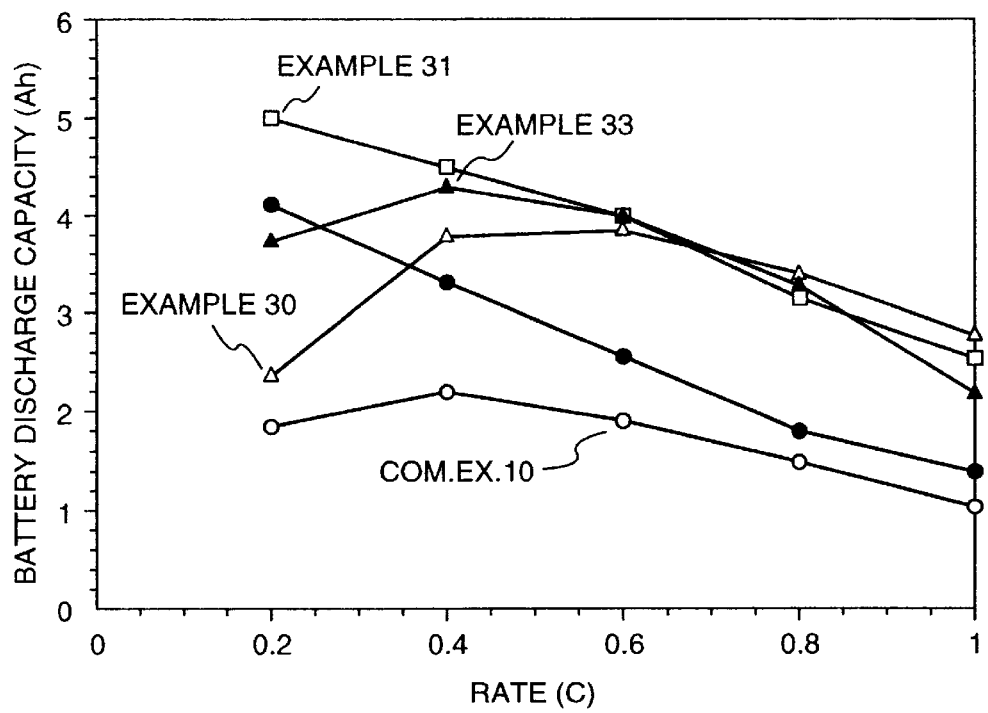
FIG. 10 is a graph showing effects on improvements of load characteristics by addition of various solvents as shown in Examples 31 to 34.

Discharge capacities of the batteries so prepared were compared by charging at a constant-current and constant-voltage (4.1 V) with the end point set to 5 $\mu$A by increasing a current value from 0.05 mA up to 5 mA successively at a rate of 0.05 mA and by discharging a constant current. The results are shown in FIG. 10.

It was found that the load characteristics were improved in any materials by addition of the high dipole moment solvent. In view of the fact that the high dipole moment solvent can readily undergo preferential orientation to lithium ions, it seems that the high dipole moment solvent undergoes electrochemical reaction on the surfaces of active substances in the lithium-oriented state and the resulting reaction products form a satisfactory SEI film on the surfaces of active substances. It was found that the requirements for the solvent to be added for improving the load characteristics were a high orientation to lithium ions and a higher dipole moment characteristic of the solvent molecules.

Then, the effect the amount of inorganic lithium salt to be added on the improvement of load characteristics was investigated, using a test battery shown in FIG. 9.

Example 34

A test battery C6 was prepared, using the liquid electrolyte A.

Example 35

A test battery C7 was prepared, using a liquid electrolyte H obtained by changing the amount of LiPF$_6$ to 0.005 moles/l in the liquid electrolyte A.

Example 36

A test battery C8 was prepared, using a liquid electrolyte I obtained by changing the amount of LiPF$_6$ to 0.2 moles/t in the liquid electrolyte A.

Comparative Example 11

A test battery CR2 was prepared, using a liquid electrolyte J obtained by changing the amount of LiPF$_6$ to 0 mole/l in the liquid electrolyte A.

Figure 11:
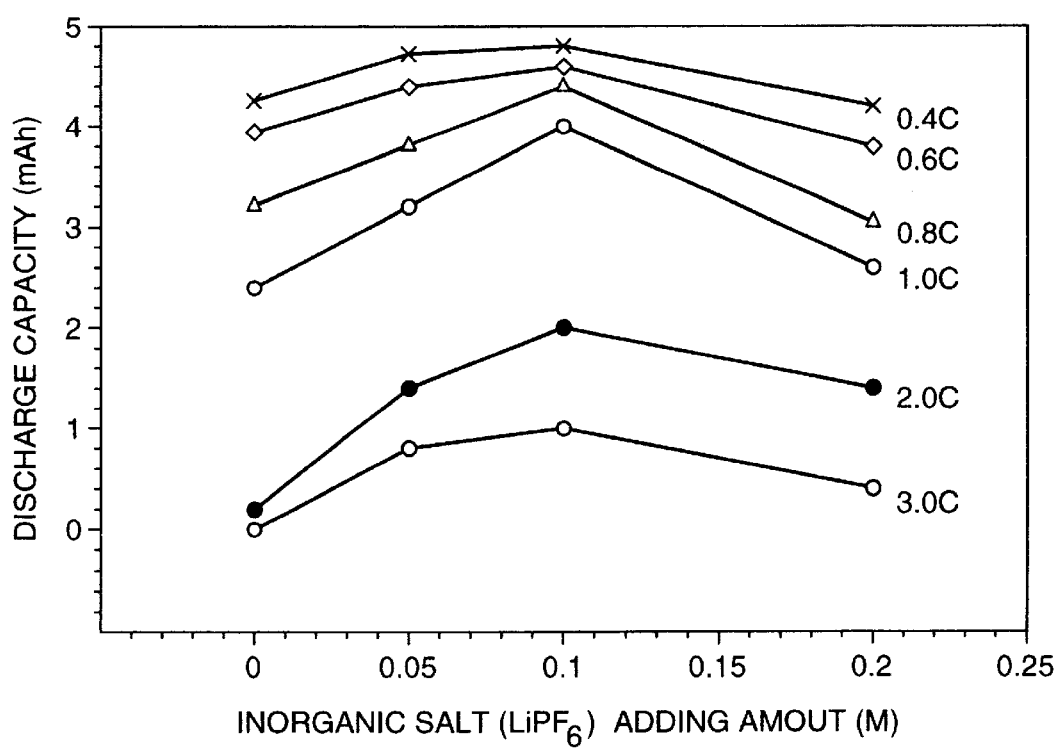
FIG. 11 is a graph showing effects on improvements of load characteristics by amounts of inorganic lithium salt $LiPF_6$ to be added according to the present invention.

The load characteristics of the batteries so prepared were evaluated under the same conditions as above, and charges in the discharge capacity with changing amounts of $LiPF_6$ are shown in FIG. 11.

As shown in FIG. 11, the load characteristics can be further improved by further adding an inorganic lithium salt $LiPF_6$ to the high dipole moment solvent. The amount of the inorganic lithium salt $LiPF_6$ has an optimum value, and the optimum limit is 0.1 mole/l in case of the liquid electrolyte A system.

Safety Test

Battery A of Example 30 and battery RI of Comparative Example 9 were subjected to safety tests such as (1) nail driving test and (2) overcharging test.

Nail driving test was carried out under the following four conditions: (1-1) room temperature at 30 mm/sec, (1-2) room temperature at 5 mm/sec, (1-2) room temperature at 1 mm/sec, and (1-4) 60° C. at 1 mm/sec. The results are shown in the following Table 5.

TABLE 5

| Test conditions | Battery A | Battery R1 |
| --- | --- | --- |
| (1-1) | 3/3 Normal | 3/3 Normal |
| (1-2) | 3/3 Normal | 1/3 Ignited |
| (1-3) | 3/3 Normal | 2/3 Ignited |
| (1-4) | 3/3 Normal | 3/3 Ignited |

It was found that the battery Ri using the conventional liquid electrolyte RI underwent ignition or explosion at low speeds and high temperatures, whereas the battery A using the present non-flammable liquid electrolyte A underwent neither ignition nor explosion under all the test conditions and had a remarkable improvement of safety.

Overcharging test was carried out, after full charging at such conditions as 0.2 C -4.1 V, under such current conditions as (2-1) 0.5 C, (2-2) 1.0 C and (2-3) 2.0 C. The results are shown in the following Table 6:

TABLE 6

| Test conditions | Battery A | Battery R1 |
| --- | --- | --- |
| (3-1) | 3/3 Normal | 3/3 Normal |
| (2-2) | 3/3 Normal | 3/3 Normal |
| (2-3) | 3/3 Normal | 3/3 Normal |

It was found that the present non-flammable liquid electrolyte had an equivalent or superior safety to that of the conventional liquid electrolyte in the overcharging test in spite of such a fear that dendrite short circuits would be liable to take place due to the low ionic conductivity and the present non-flammable liquid electrolyte would be inferior to that of the conventional liquid electrolyte having a high ionic conductivity.

As described above, it is the present invention that could improve, for the first time the load characteristics of a non-flammable liquid electrolyte system containing a large amount of the fluorinated solvent by adding very small amounts of these high dipole moment solvent and the inorganic lithium salt thereto. Without addition of these substances, it seems difficult to drastically improve the load characteristics of a non-flammable liquid electrolyte containing a very small amount of a non-fluorinated solvent (conventional solvent) acting as an essential lithium ion transfer medium, as in the present invention.

Examples 37–39

Vapor liquid phase diagrams were prepared at the time of mixing a non-flammable solvent and a non-aqueous solvent.

Example 37

Figure 12:
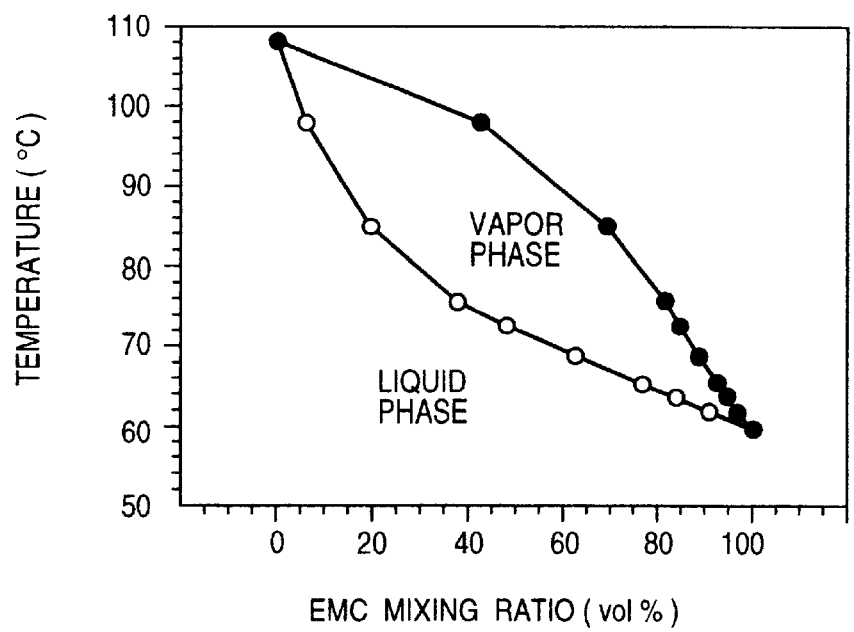
FIGS. 12–25 are graphs showing results of Examples 37–84.

FIG. 12 is a vapor liquid phase diagram of a mixed solvent of a non-flammable solvent HFE 7100 and a non-aqueous solvent EMC. In this mixed solvent, there is no flash point until 20% by volume of EMC in the mixture as shown previously. At this mixing ratio, the vapor of the mixed solvent contains 93% by volume or more of non-flammable solvent HFE 7100 as shown in FIG. 12, resulting in making the flammability of the vapor remarkably low.

Example 38

Figure 13:
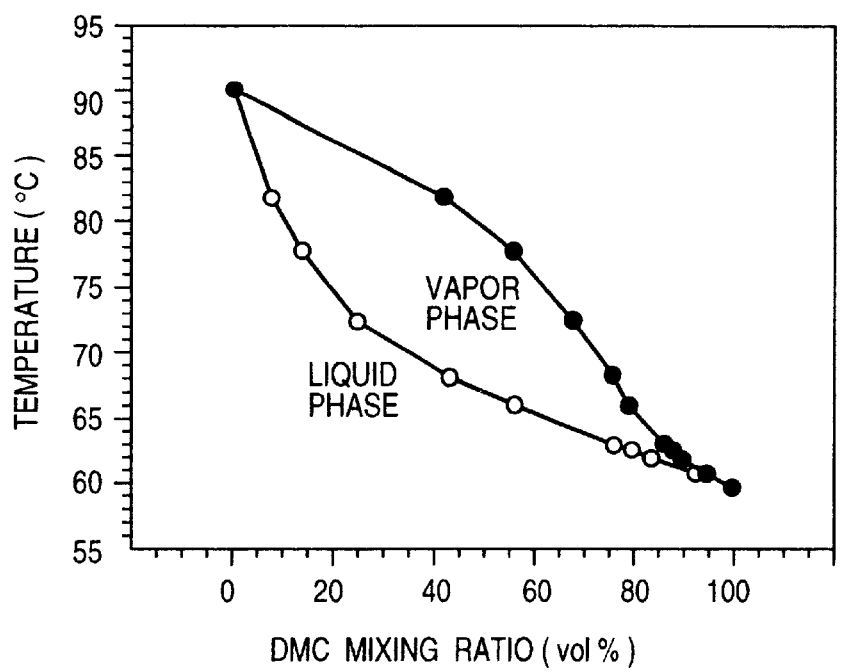

FIG. 13 is a vapor liquid phase diagram of a mixed solvent of HFE 7100 and DMC. In this case, since the vapor pressure of DMC is higher than that of EMC, a difference in boiling points $\Delta T(B.P.)$ is 30° C. (the boiling point of DMC is 90° C. and the boiling point of HFE is 60° C.) and $\Delta T(B.P.)$ of HFE 7100-EMC system is narrower than about 50° C., the vapor phase volume percentage of HFE 7100 in the region of lower mixing ratio of DMC becomes lower. Thus, the area having no flash point in the HFE 7100-DMC system becomes narrower than that in the HFE 7100-EMC system.

Example 39

Figure 14:
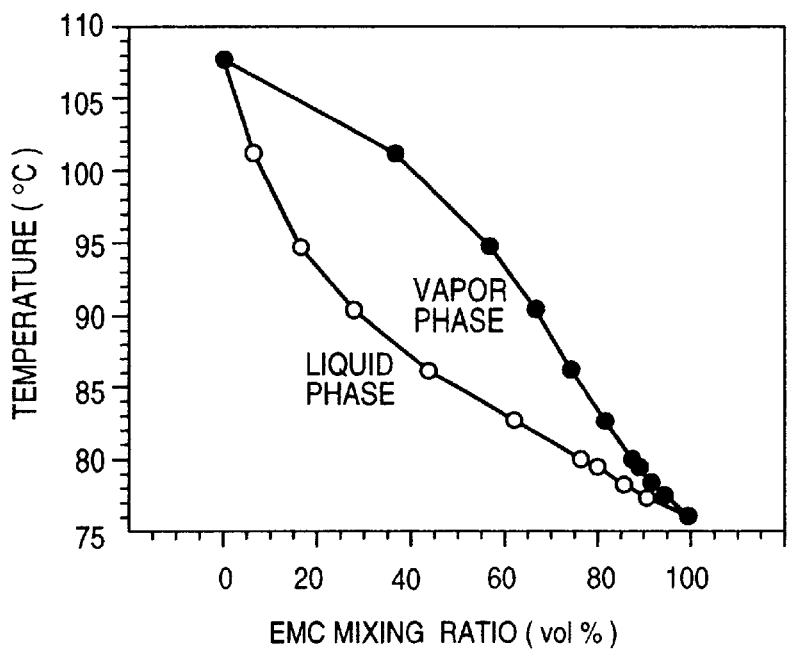

FIG. 14 is a vapor liquid phase diagram of a mixed solvent of HFE 7200 and EMC. In this system, since $\Delta T$ (B.P.) is as narrow as about 30° C., the volume percentage in HFE 7200 vapor phase in the EMC rich region becomes lower. Further, since HFE 7200 has a F/H ratio in the molecule of 1.8, which value is lower than the F/H ratio of 3 of HFE 7100, the fire extinguishing function is low, resulting in making this system flammable even in a low mixing ratio of EMC of 20% by volume.

As mentioned above, the non-flammability of a mixed solvent of a non-flammable fluorine solvent and flammable solvent seems to be dependent on suffocation of the vapor of the fluorine solvent in high content. Thus, the wider the difference between boiling points $\Delta T(B.P.)$ with the fluorine solvent becomes, the wider the region having no flash point becomes.

Examples 40–43

Changes of ionic conductivities with the change of lithium salt LIBETI concentration in a mixed solvent of HFE 7100 and TGM (triglyme) having the composition as shown in Table 7 were examined.

TABLE 7

| Example No. | Solvent composition (volume %) | Lithium salt |
| --- | --- | --- |
| 40 | HFE 7100:TGM = 80:20 | LiBETI |
| 41 | HFE 7100:TGM = 60:40 | LiBETI |
| 42 | HFE 7100:TGM = 40:60 | LiBETI |
| 43 | HFE 7100:TGM = 20:80 | LiBETI |

Figure 15:
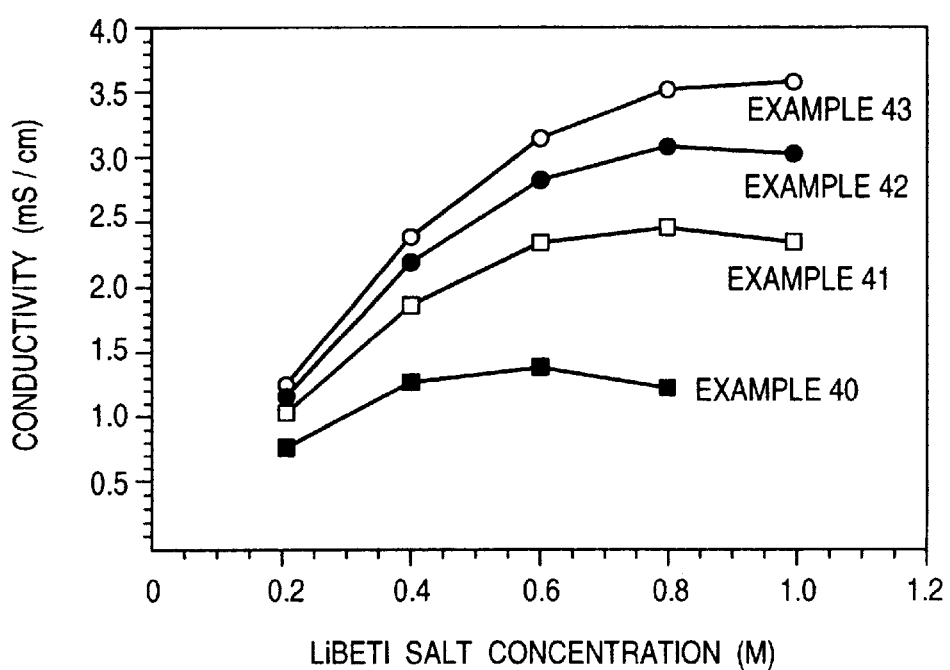

The results are shown in FIG. 15. As is clear from FIG. 15, the maximum point of the conductivity shifts to a higher concentration of the lithium salt depending on the mixing ratio of TGM, and the absolute value also become larger depending on the mixing ratio of TGM.

Examples 44–47

Changes of ionic conductivities with the change of lithium salt LiBETI concentration in a mixed solvent of HFE 7100 and DME (dimethoxyethane) having the composition as shown in Table 8 were examined.

Figure 16:
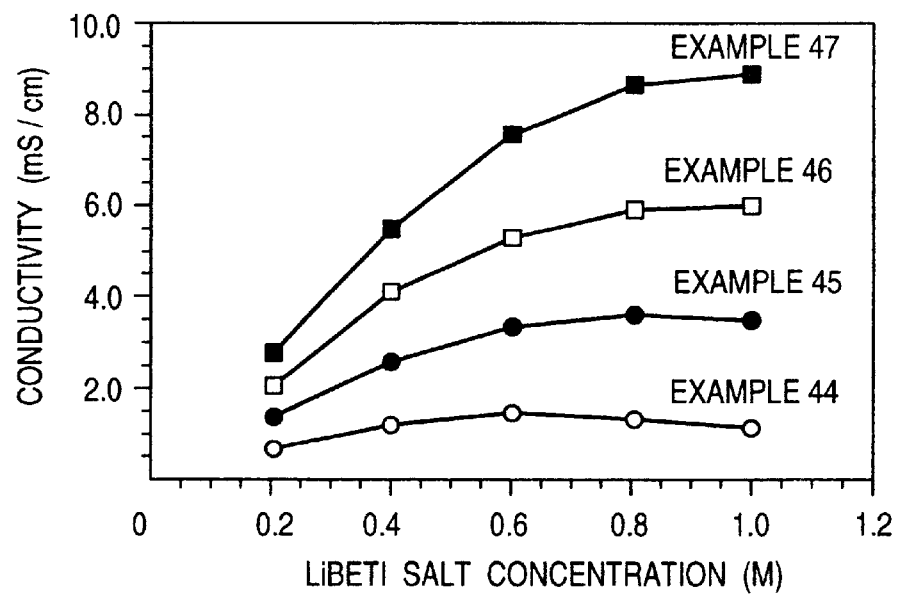

The results are shown in FIG. 16. As is clear from FIG. 16, the maximum point of the conductivity also shifts to a higher concentration of the lithium salt depending on the mixing ratio of DME, and the absolute values also become larger depending on the mixing ratio of DME.

TABLE 8

| Example No. | Solvent composition (volume %) | Lithium salt |
|---|---|---|
| 44 | HFE 7100:DME = 80:20 | LiBETI |
| 45 | HFE 7100:DME = 60:40 | LiBETI |
| 46 | HFE 7100:DME = 40:60 | LiBETI |
| 47 | HFE 7100:DME = 20:80 | LiBETI |

Example 48–53

Changes of the ionic conductivities with the change of lithium salt LiBETI concentration in a mixed solvent having the composition shown in Table 9, i.e. HFE 7100 (80% by volume), DME (20% by volume), and 0.5 mol/liter of PC (propylene carbonate: Example 48), CLEC (chloroethylene carbonate; Example 49), DMVC (4,5-dimethylvinylene carbonate: Example 50), EC (ethylene carbonate: Example 51), BC (butylene carbonate: Example 52) and TFPC (trifluoropropylene carbonate: Example 53) were examined.

TABLE 9

| Example No. | Solvent composition |
|---|---|
| 48 | HFE 7100 + DME + PC |
| 49 | HFE 7100 + DME + CLEC |
| 50 | HFE 7100 + DME + DMVC |
| 51 | HFE 7100 + DME + EC |
| 52 | HFE 7100 + DME + BC |
| 53 | HFE 7100 + DME + TFPC |

Figure 17:
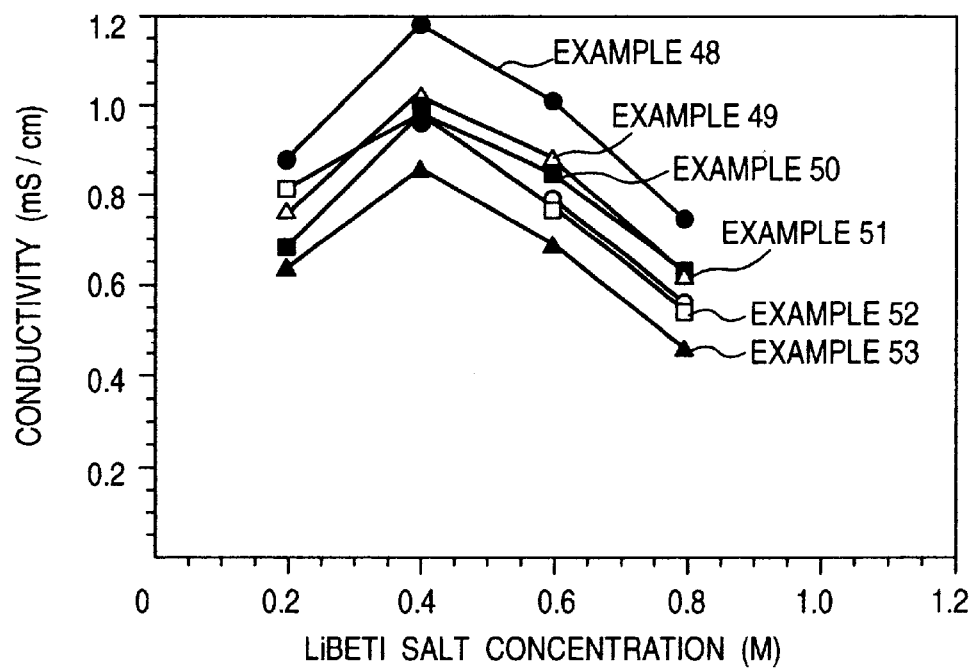

The results are shown in FIG. 17. As is clear from FIG. 17, when a solvent having a high ionic conductivity is added to an electrolyte of HFE 7100-DME, the absolute values of conductivity are slightly lowered, but the maximum point against the lithium salt concentration become 0.4 M (mol/liter), which value is lower than the maximum point of 0.6 M of the HFE 7100-DME system containing no high ionic conductivity solvent. That is, by the addition of a high ionic conductivity solvent, the necessary amount of precious lithium salt can be suppressed low.

Examples 54–56

Changes of ionic conductivities with the change of lithium salt LiBETI concentration in a mixed solvent of HFE 7100 (90% by volume) and as a non-aqueous solvent DME (10% by volume) (Example 54), HFE 7100 (85% by volume) and DME (15% by volume) (Example 55), and HFE 7100 (80% by volume), DMC (10% by volume) and DME (10% by volume) (Example 56) were examined.

Figure 18:
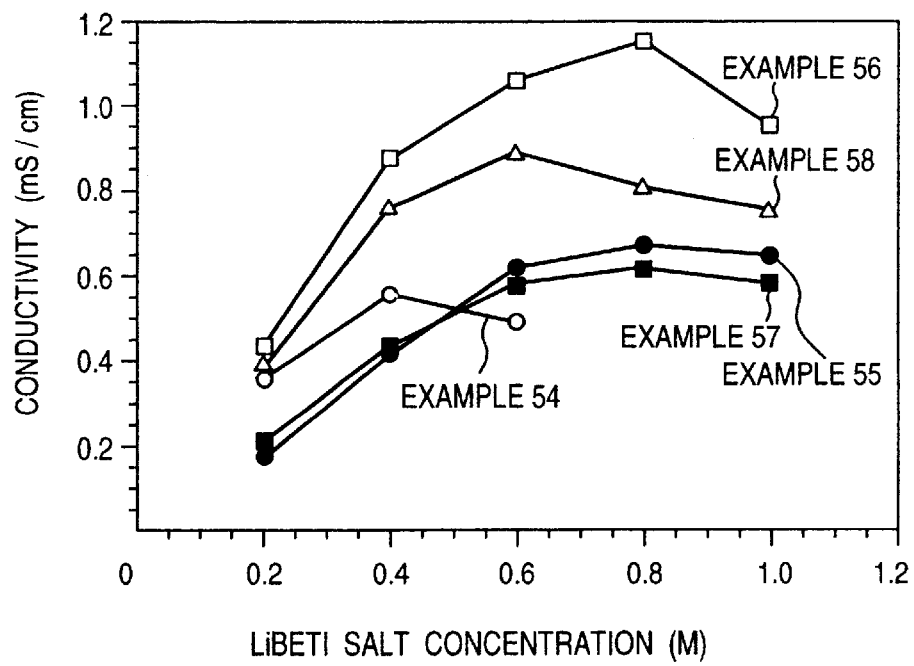

The results are shown in FIG. 18.

In Example 54 (a mixed solvent of HFE 7100:DME= 90:10), the lithium salt was dissolved up to 0.6 M, but the conductivity showed a maximum value of 0.55 mS/cm at 0.4 M. In the three solvent system containing DMC, the conductivity increased with a mixing ratio of DMC. When the mixing ratio was 10% by volume (HFE 7100 DMC:DME= 80:10:10), the conductivity showed 1.15 mS/cm at a shifted maximum value of 0.8 M.

Examples 57 and 58

Electrolytes were prepred by mixing HFE 7100 with the following two kinds of non-aqueous solvents to examine the lithium salt concentration dependency.

EMC 15% by volume+DME 5% by volume ... Example 57

EMC 10% by volume+DME 10% by volume ... Example 58

When EMC was mixed, the conductivity increased with the mixing ratio of EMC as in the case of DMC. But, in the case of EMC, the conductivity showed the maximum value of 0.9 mS/cm at the lithium salt concentration of 0.6 M in the electrolyte composition of HFE 7100:EMC DME=80:10:10 (by volume).

Examples 59–62

Figure 19:
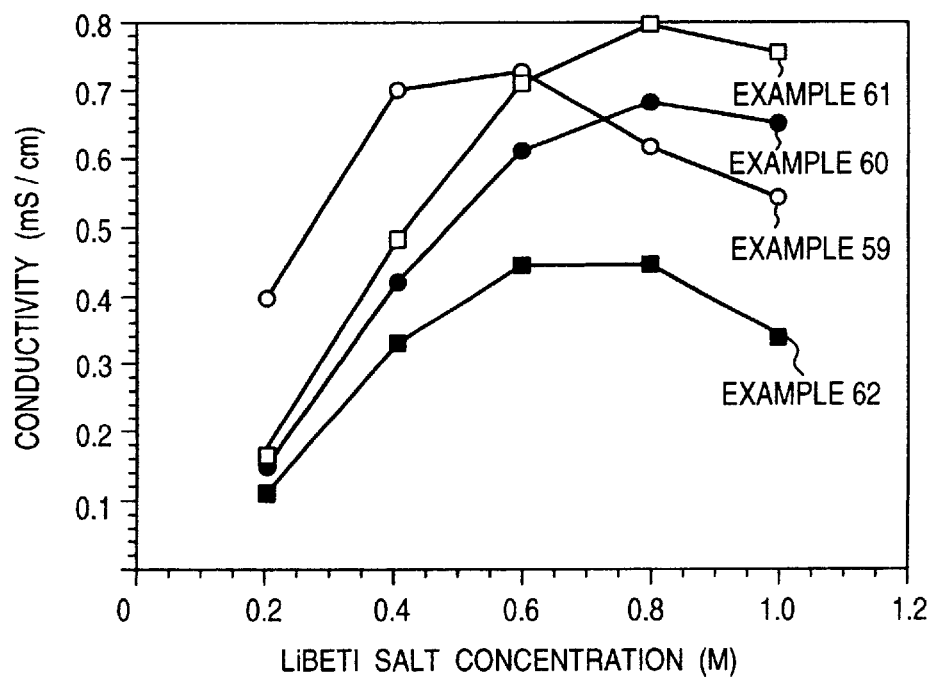

The same evaluation as in Examples 57 was conducted as to the electrolyte systems containing HFE 7100 and 1,3-dioxolane (DOL) as a non-aqueous solvent. The results are shown in FIG. 19.

DMC 10% by volume+DOL 10% by volume ... Example 59

DME 10% by volume+DOL 10% by volume ... Example 60

In the case of the mixture of DOL and DMC, the maximum value was 0.72 mS/cm at the lithium salt concentration of 0.6 M. In the case of the mixture of DOL and DME, the maximum value was 0.68 mS/cm at the lithium salt concentration of 0.8 M.

When the lithium salt LiBETI concentration was increase in the electrolyte of HFE 7100:DMC=80:20 (by volume) (Example 61) or HFE 7100:DEC=80:20 (by volume) (Example 62), the maximum point of change of conductivity was at the lithium salt concentration of 0.8 M.

Examples 63–66

Mixing effect of DME with a HFE 7100-DEC system on the lithium salt concentration was examined. The mixing ratio (by volume) was as follows:

HFE 7100:DEC=80:20 ... Example 63

HFE 7100:DEC:DME=80:10:10 ... Example 64

HFE 7100:DEC:DME=80:15:5 ... Example 65

HFE 7100:DEC:DME=70:20:10 ... Example 66

Figure 20:
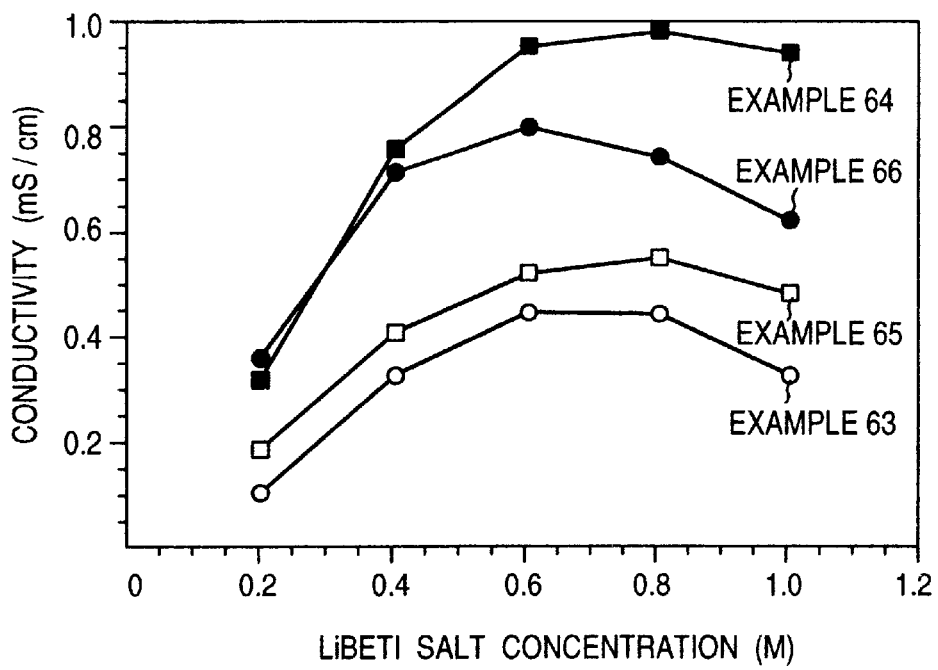

The results are shown in FIG. 20. In the electrolyte of Example 66 containing 10% by volume of DME, the maximum value of conductivity shifted to the lithium salt concentration of 0.6 M. Considering the above-mentioned results, when DME is mixed with other non-aqueous electrolyte in a volume of about 10%, the maximum value of conductivity can be shifted to a lower concentration.

Examples 67–69

Changes of ionic conductivities with the change of lithium salt LIBETI concentration in a mixed solvent of HFE 7100 and diglyme (DGM) (by volume) were examined.

HFE 7100:DGM=80:20 ... Example 67

HFE 7100:DGM=70:30 ... Example 68

HFE 7100:DGM=60:40 ... Example 69

Figure 21:
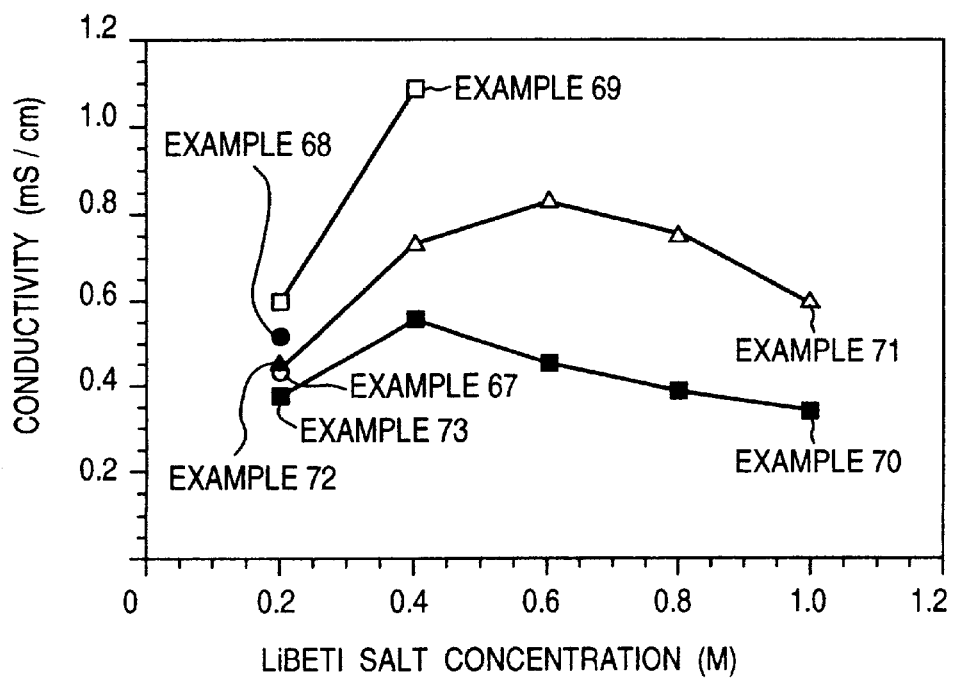

The results are shown in FIG. 21.

In the case of DGM, the lithium salt was dissolved in an amount of up to 0.2 M in a two component mixing system containing 20 or 30% by volume. Even if 40% by volume of DGM was contained, the dissolution limit was 0.4 M. In Example 69, the conductivity was as high as 2.7 mS/cm.

Examples 70–73

Changes of conductivities with the change of lithium salt LiBETI concentration in a mixed solvent containing HFE 7100, DGM and a third non-aqueous solvent (by volume) were examined.

HFE 7100:DGM:DMC=80:10:10 . . . Example 70
HFE 7100:DGM:DME=80:10:10 . . . Example 71
HFE 7100:DGM:DMC=80:15:5 . . . Example 72
HFE 7100: DGM:DME=80:15:5 . . . Example 73

The results are shown in FIG. 21. As shown in FIG. 21, by mixing a non-aqueous solvent such as DMC and DME, it is possible to obtain a lithium salt dissolving ability of 1 M or more even at a low mixing ratio of DGM of 10% by volume.

Further, the effcts obtained in Examples 71 and 72 cannot be obtained when DMC or DME is 5% by volume. This means that DGM is suitable as a solvent for accelerating dissociation of lithium ions.

Examples 74–76

Changes of conductivities with the change of lithium salt LiBETI concention in a mixed solvent of HFE 7100 and triglyme (TGM) (by volume) were examined.

HFE 7100:TGM=80:20 . . . Example 74
HFE 7100:TGM=70:30 . . . Example 75
HFE 7100:TGM=60:40 . . . Example 76

Figure 22:
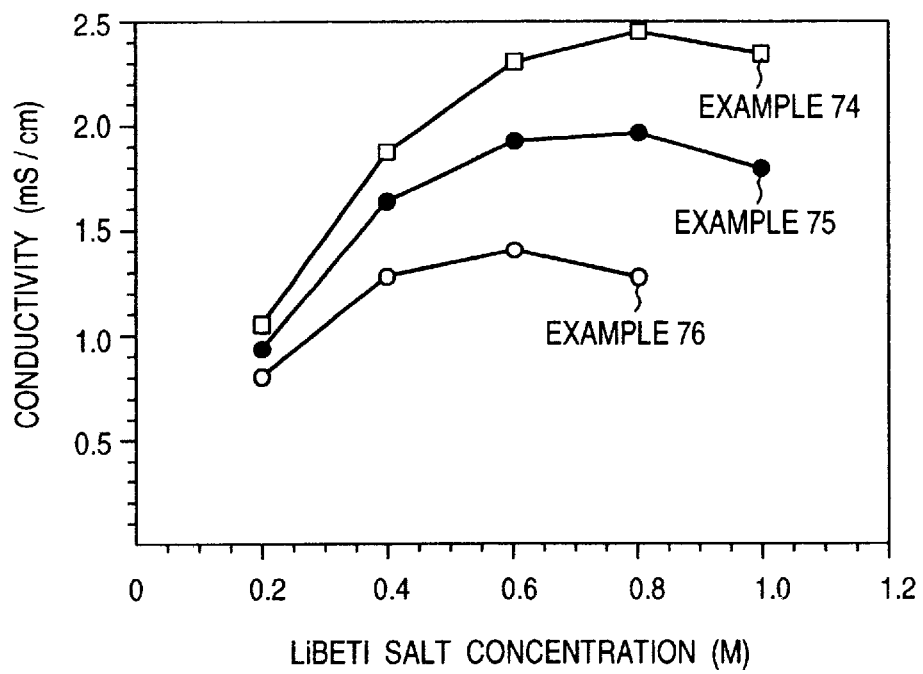

The results are shown in FIG. 22. In the case of TGM, the lithium salt was dissolved in an amount of 0.6 M or more even in the two-component solvent system. But, when the mixing ratio of TGM is 40% by volume or more, there is a limit in dissolution.

Examples 77–81

Figure 23:
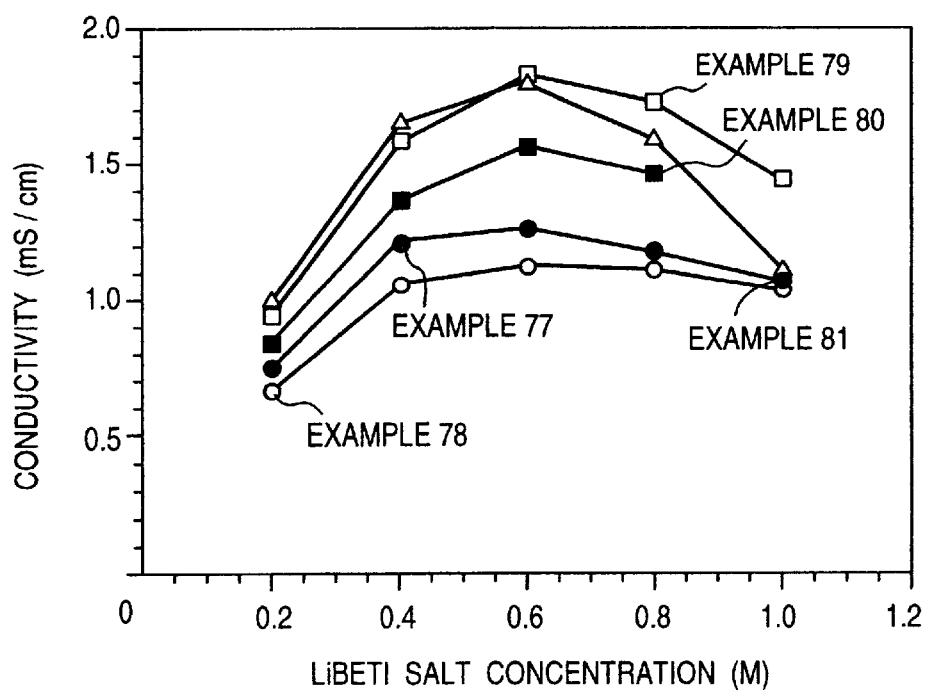

Ionic conductivities were examined in a mixed solvent obtained by mixing a third non-aqueous solvent with the HFE 7100 and TGM system (by volume). The results are shown in FIG. 23.

HFE 7100:TGM:DMC 80:15:5 . . . Example 77
HFE 7100:TGM:DMC 80:10:10 . . . Example 78

When TGM and DMC are mixed, there is a tendency of lowering the conductivity with an increase of mixing amount of DMC. Further, in the system of HFE 76100-TGM-DMC, the change of conductivity for the lithium salt concentrations from 0.4 M to 1.0 M becomes flat, resulting in otaining stable properties of the batteries.

HFE 7100:TGM:DME=80:15:5 . . . Example 79
HFE 7100:TGM:DME=80:10:10 . . . Example 80

When TGM and DME are mixed, the conductivity shows the maximum value at the lithium salt concentration of 0.6 M. Further, the maximum values are the same around 1.7 mS/cm irrespective of the mixing ratio of DME. In addition, this value is remarkably higher than the maximun value of 1.35 mS/cm in the system of HFE 7100:TGM=80:20 (by volume). This means that by mixing DME, the conductivity of the HFE 7100-TGM system can be raised higher.

HFE 7100:TGM:DGM=80:10:10 . . . Example 81

When TGM and DGM are mixed, the lithium salt was only dissolved up to 0.8 M. The maximum value of conductivity at 0.6 M was 1.55 mS/cm, which value is higher than the maximum value of 1.35 mS/cm in the system of HFE 7100:TGM=80:20. This means that by mixing DGM, the conductivity of the HFE 7100-TGM system can be raised.

Example 82

A 18650 type cylindrical lithium secondary battery was prepared by using as an electrolyte HFE 7100:TGM:CLEC= 80:15:5 dissolving lithium salt LiBETI in an amount of 0.8 M, as a positive electrode material lithium cobaltite, and as a negative electrode graphite carbon.

Example 83

The same battery as in Example 82 was prepared except for using as an electrolyte a mixed solvent of HFE 7100:TGM:PC=80:15:5 dissolving the lithium salt in an amount of 0.8 M.

Figure 24:
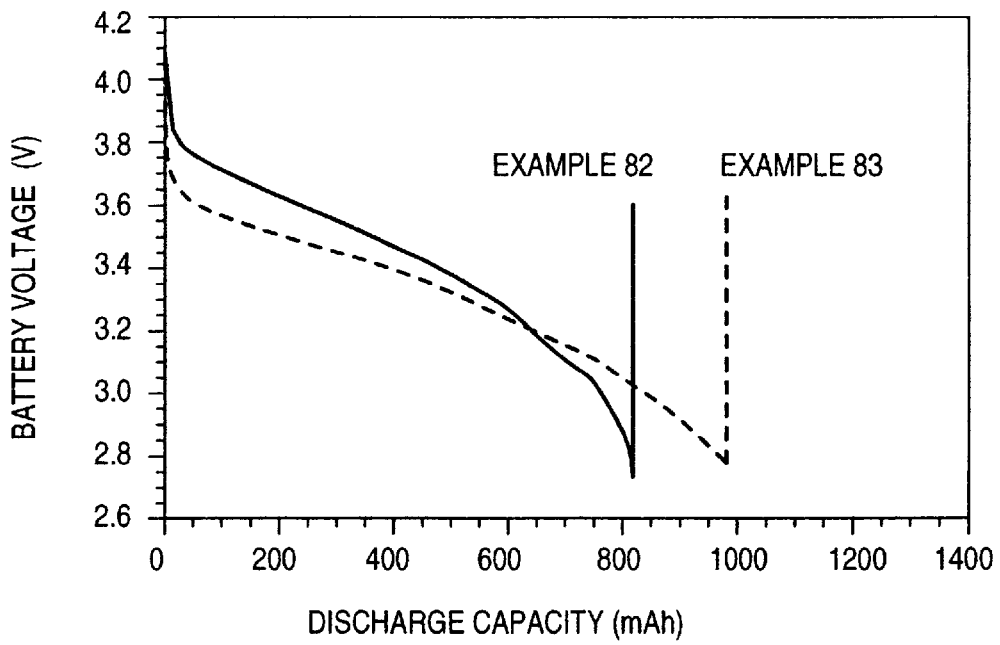

FIG. 24 shows discharge curves at a second time of these batteries of Examples 82 and 83.

Example 84

Figure 25:
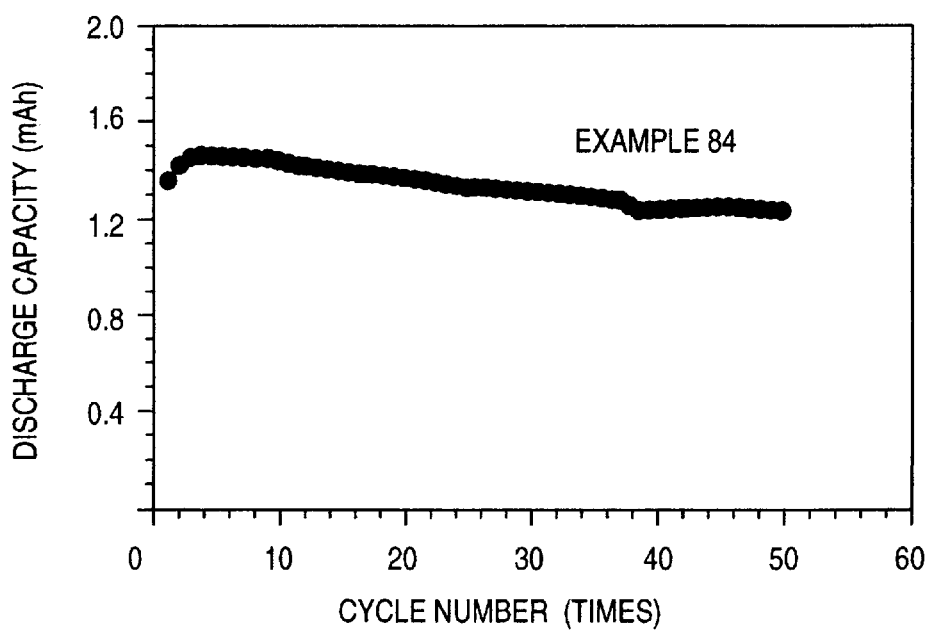

A test cell mentioned above (FIG. 9) was prepared by using as an electrolyte HFE 7100:DME=90:10 dissolving a lithium salt LiBETI in an amount of 0.6 M, as a positive electrode lithium manganite, and as a negative electrode amorphous carbon. FIG. 25 shows the test results of charge-discharge cycle of this battery. As shown in FIG. 25, the capacity lowering rate after 50 cycles is within 20% of the maximum initial capacity.

Example 85

Figure 26:
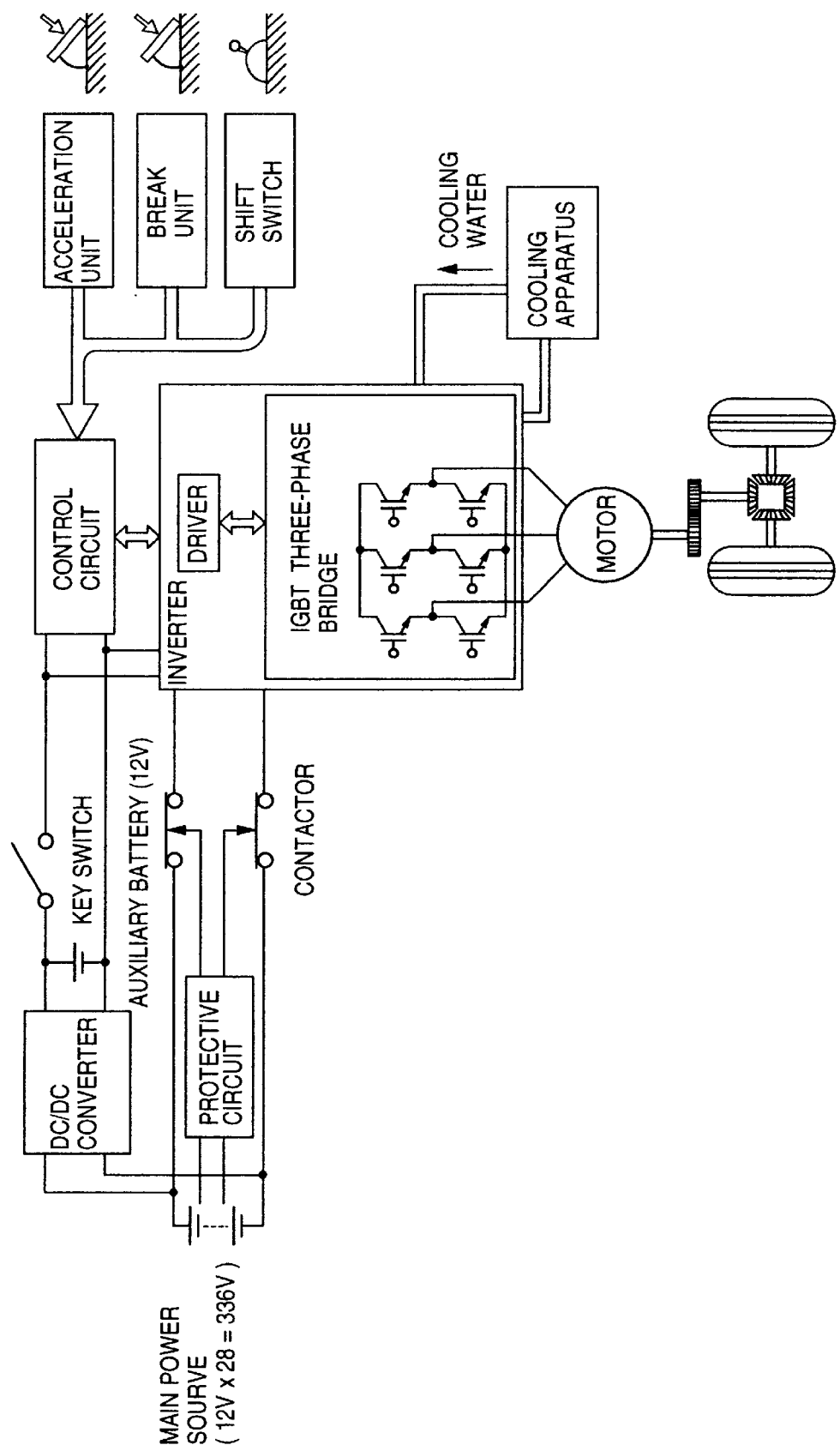
FIG. 26 shows a system structure for driving an electric car using lithium secondary batteries as given in Examples 1 to 84.

FIG. 26 shows a system structure for driving an electric car using lithium secondary batteries given in Examples 1 to 84.

In an electric car, as in the ordinary gasoline engine car, the key switch is turned on and the accelerator is stepped on. Motor torque or revolution can be controlled according to step angles of the accelerator. When the accelerator is stepped off, the regenerative brake corresponding to the engine brake is actuated. When the brake is stepped on, the regenerative braking force is made to further increase. By shift lever signals, the car can be switched to forward or backward driving, while keeping a transmission shift ratio always constant. Control system is based on IGBT vector control inverter system using an induction motor, and the power source voltage is set to 336 V from the viewpoint of the IGBT withstand voltage.

In this Example, the output is set to a maximum power of 45 kW and maximum torque of 176 N·m from the viewpoint of the power performance capabilities (acceleration capability and gradability) required for the car, and the rated output is set to 30 kW from the viewpoint of the maximum speed specification. Main control items are a forward- and backward-driving control, a regenerative control and also a fail-safe control.

To meet the higher heat density due to downsizing and weight reduction of motors, it is important to make the motors into an efficiently cooled structure. Ordinary air cooling system cannot prevent the motors from temperature elevation, and thus a water cooling system is employed as in case of the ordinary engine. Cooling water channels are provided in the aluminum frame housing the motor proper and made into an optimum shape by temperature elevation simulation. Cooling water flows into the water channels in the frame through the water inlet, flows out after absorption of heat from the motor proper and is cooled by a radiator in the recycle route. The water cooling system can improve the cooling performance about 3 times as high as that of the air cooling system.

Inverter uses IGBT as a power device and generates heat of about several kW maximum at the maximum output. Besides, surge absorber resistances, filter condensers, etc. also generate heat, and thus it is necessary to efficiently cool these parts, thereby suppressing them below the allowable temperatures. Particularly, cooling of IGBT is a problem, and air cooling, water cooling, oil cooling, etc. can be selected as its cooling system. In this Example, a forced cooling system with easy handling and efficient cooling is selected.

Figure 27:
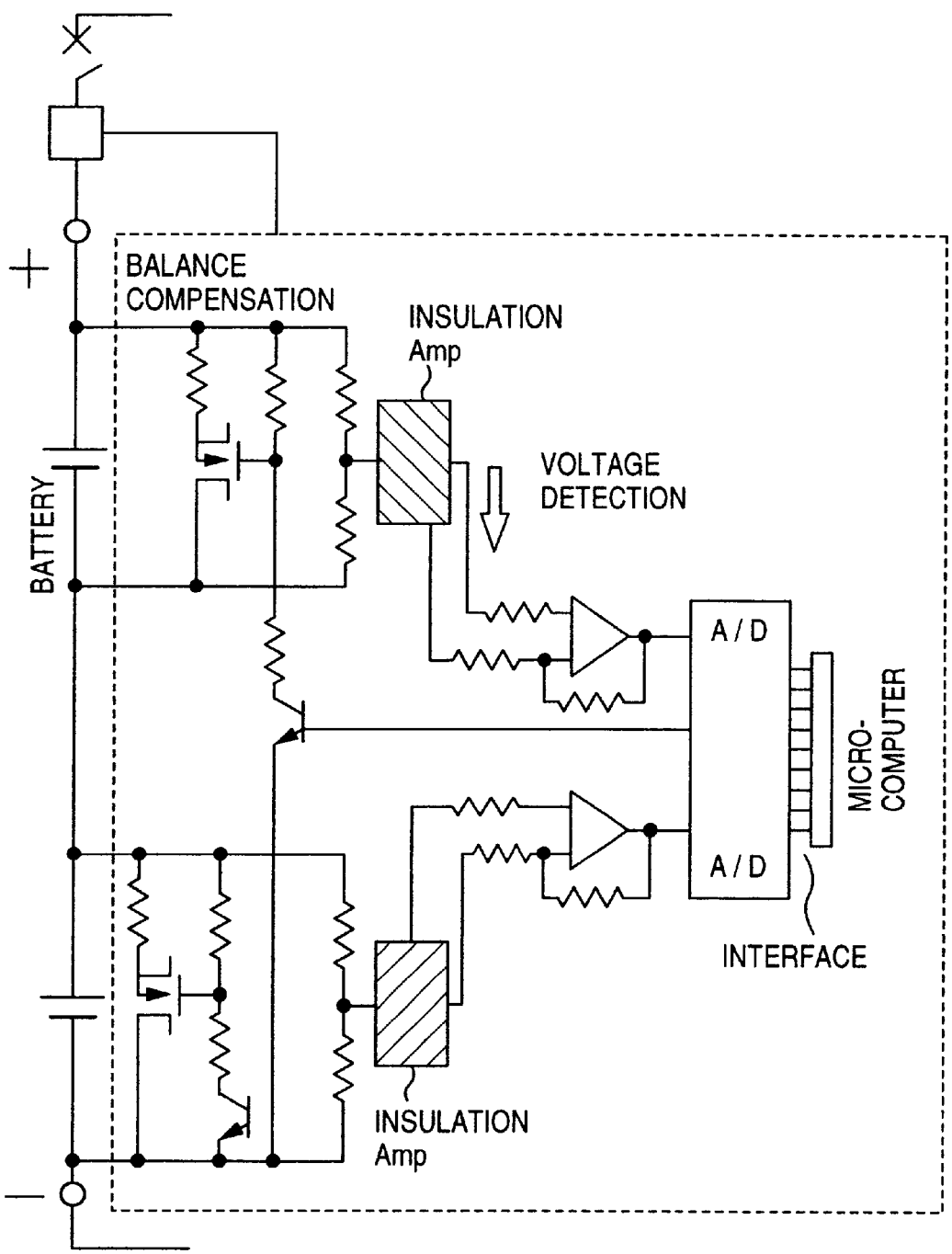
FIG. 27 shows a protection circuit for the lithium secondary batteries as a power source as given in Example 85.

A protection circuit for the lithium secondary batteries as the power source is provided in this Example, as shown in FIG. 26, and protects the batteries from overcharging and overdischarging. The protection circuit comprises balance compensation circuits each for adjusting the cell voltage of the respective batteries as shown in FIG. 27, which are thus provided in the batteries, respectively. The balance compensation circuits are controlled by a microcomputer.

The conventional lithium secondary batteries using a flammable liquid electrolyte have been monitored by detecting temperature or pressures by thermistors provided on the respective batteries, whereas this Example uses the non-flammable liquid electrolyte having such no flash point that a flame, even if made to approach the liquid electrolyte, will not spread to the liquid electrolyte, unnecitating any special monitoring of temperatures or pressures. That is, the safety mechanism as the protection circuit can be reduced in the present invention thereby. As shown in FIG. 26, the power source will be automatically turned on or off, when the overcharging is detected.

Figure 28:
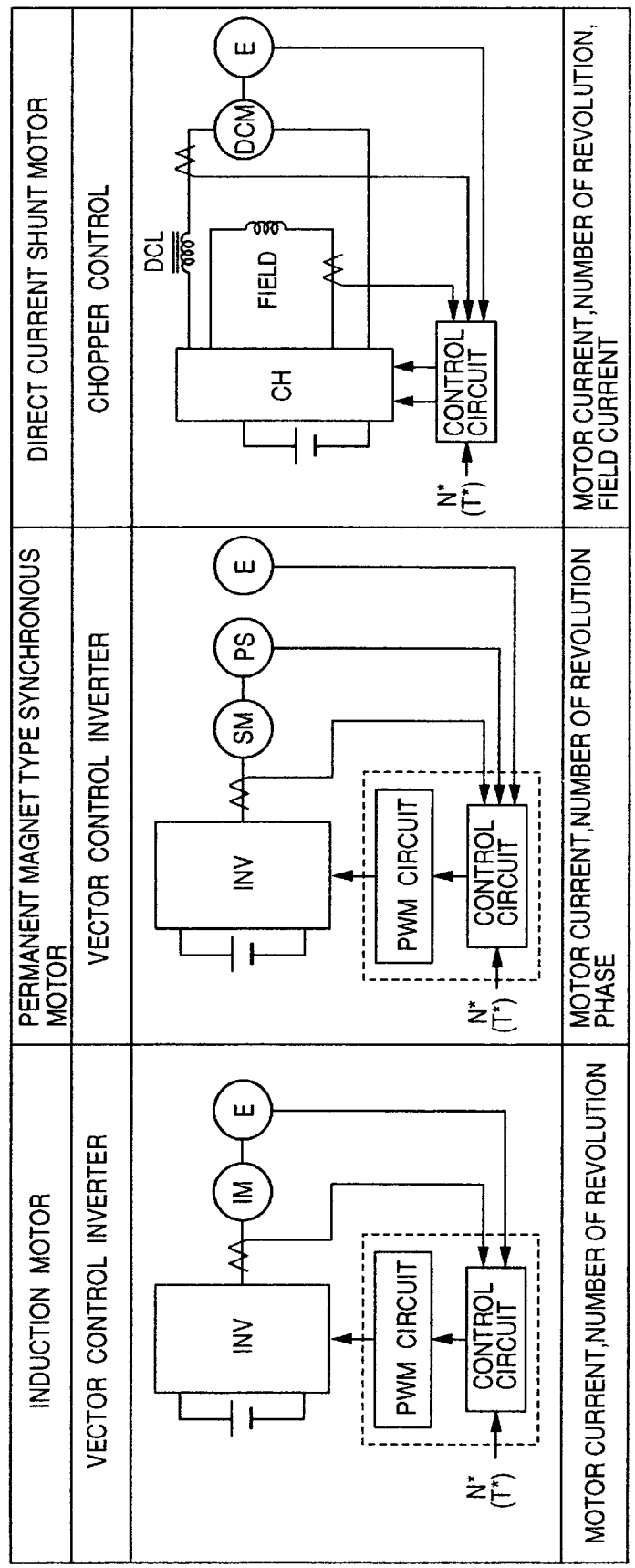
FIG. 28 shows control systems, system structures and main control parameters for driving an electric car based on an induction motor, a permanent magnet type synchronous motor and a DC motor, respectively, using lithium secondary batteries, as given in Examples 1 to 84.

This example shows the case of using an induction motor, but as shown in FIG. 28, the present lithium secondary batteries can be likewise used in an electric car using a permanent magnetic type synchronous motor and a DC motor besides the induction motor, where INV is an inverter, IM an induction motor, E an encoder, SM a synchronous motor, PS a position sensor, PWM a pulse width modulation, DCM a DC motor, CH a chopper, N* a speed instruction and T* a torque instruction, and the rows under the respective captioned motor types show control system, system structure and main control parameter, respectively.

Example 86

Figure 29:
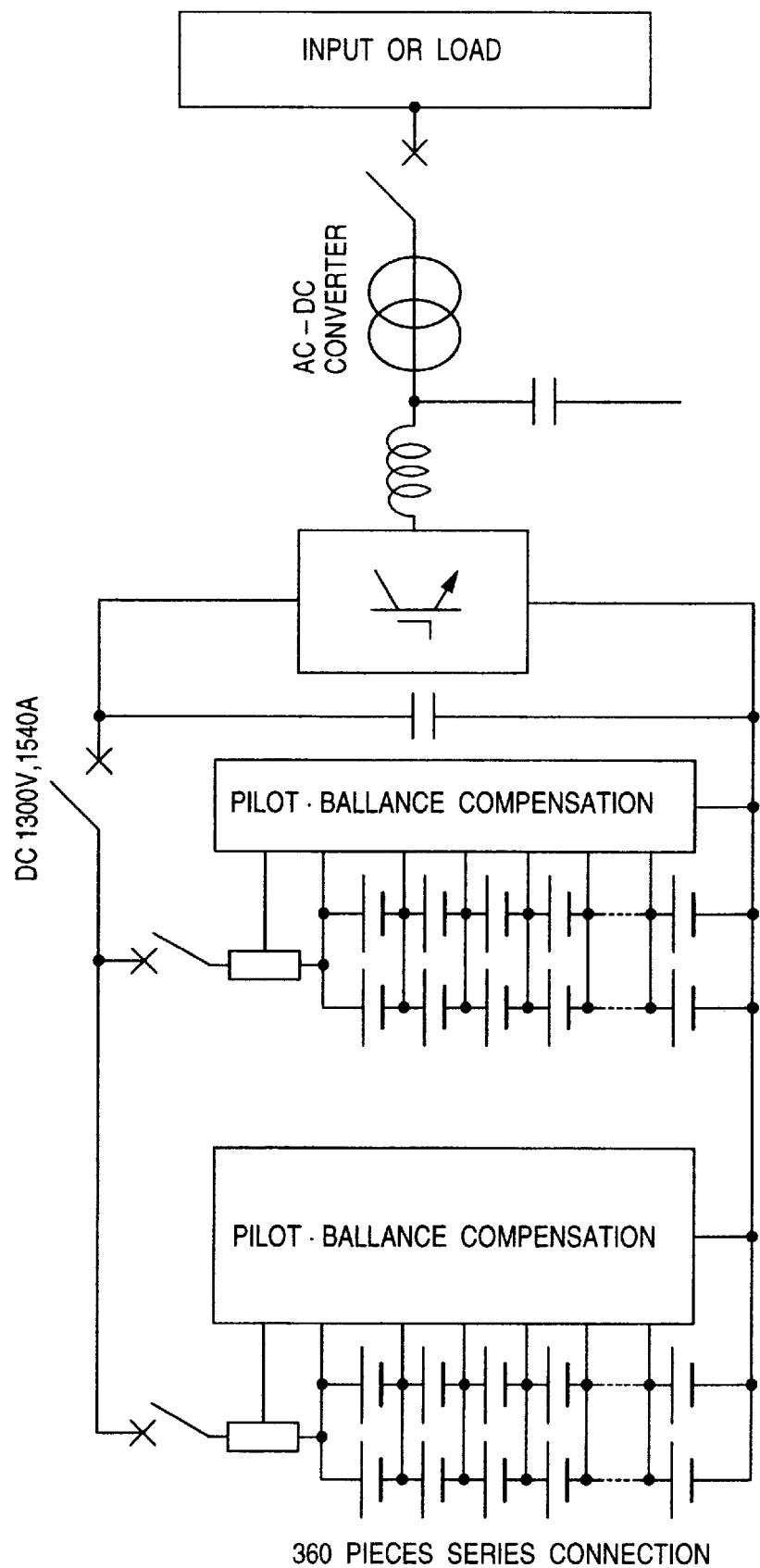
FIG. 29 shows a system structure for power storage during night hours, using lithium secondary batteries, as given in Examples 1 to 84.

FIG. 29 shows a system structure for power storage during night hours, using the present lithium secondary batteries as given in Examples 1 to 84. This power storage system is based on 2,000 kW×4 h and cell capacity of 1,000 Wh, using 24 parallel connections of 360 batteries in series connections. In this Example, it is necessary to protect the batteries from overcharging and overdischarging as in Example 85, and the same protection circuit having monitoring-balance compensation circuits as shown in FIG. 27 can be used in this Example to protect the batteries likewise. This Example is directed to a large capacity of power storage and is effective also for the domestic air conditioners, electric water-heating systems, etc.

The present invention can make essentially non-flammable lithium secondary batteries for domestic uses and also large capacity lithium secondary batteries for use in power storage or electric cars and can provide lithium secondary batteries having a drastically improved safety and a high reliability, applicable to various uses.

Furthermore, the present liquid electrolyte is non-flammable and thus the volemic restriction to the liquid electrolyte to be stocked at the production sites can be lessened, so that much more liquid electrolyte can be stocked for the production than at present, with contributable merits to production or inventory adjustment, etc.

Furthermore, safety maintenance, weight reduction and downsizing of the batteries can be expected, and the protection mechanism provided within the batteries or exterior protection circuit, etc. can be reduced or eliminated as further remarkable effects.

What is claimed is:

1. An electrical appliance using lithium secondary batteries, which have a non-flammable liquid electrolyte, as a power source, which comprises a protection circuit for the lithium secondary batteries, and a protecting means for protecting overcharging and overdischarging of the lithium secondary batteries, said protecting means comprising a means for detecting a voltage or current of the lithium secondary batteries, and a means for on-off controlling the power source on the basis of detected voltage or current values, said protection circuit being operated by detecting the voltage or current of the lithium secondary batteries without monitoring temperatures and pressures thereof.

2. An electrical appliance according to claim 1, for use in air conditioners, electric water-heating systems, electric cars or power storage systems using lithium secondary batteries.

3. An electrical appliance according to claim 1, wherein the protection circuit is provided in the lithium secondary batteries and comprises balance compensation circuits each for adjusting the cell voltage of the respective batteries, said balance compensation circuits being controlled by a microcomputer which detects an output from the balance compensation circuits.

4. An electrical appliance according to claim 3, wherein the balance compensation circuits are provided in each cell of a plurality of lithium secondary batteries.

5. An electrical appliance using lithium secondary batteries, which have a non-flammable liquid electrolyte, as a power source, which comprises a protection circuit for the lithium secondary batteries, and a protecting means for protecting overcharging and overdischarging of the lithium secondary batteries, said protecting means comprising a means for detecting a voltage or current of the lithium secondary batteries, and a means for on-off controlling the power source on the basis of detected voltage or current values, said protection circuit being operated by detecting the voltage or current of the lithium secondary batteries without monitoring temperatures and pressures thereof, wherein each lithium secondary battery comprises a non-aqueous liquid electrolyte containing a non-flammable fluorinated solvent which is a fluorinated ether represented by the following formula (1):

$$C_mF_{2m+1}\text{—}O\text{—}C_nH_{2n+1} \qquad (1)$$

where m is an integer of 2 to 8, n is an integer of 1 to 5 and m and n are in such a relation as $m \geq ((6n+1)/4)$, having an electrical conductivity of 0.05 mS/cm or more.

6. An electrical appliance using lithium secondary batteries, which have a non-flammable liquid electrolyte, as a power source, which comprises a protection circuit for the lithium secondary batteries, and a protecting means for protecting overcharging and overdischarging of the lithium secondary batteries, said protecting means comprising a means for detecting a voltage or current of the lithium secondary batteries, and a means for on-off controlling the power source on the basis of detected voltage or current values, said protection circuit being operated by detecting the voltage or current of the lithium secondary batteries without monitoring temperatures and pressures thereof, wherein each lithium secondary battery comprises a lithium-storable and releasable negative electrode, a lithium-storable and releasable positive electrode, a separator and a lithium salt-containing non-aqueous liquid electrolyte, the non-aqueous liquid electrolyte comprising a mixed solution of (I) a non-flammable fluorinated solvent which is a fluorinated ether represented by the following formula (1):

$$C_mF_{2m+1}\text{—}O\text{—}C_nH_{2n+1} \quad (1)$$

where m is an integer of 2 to 8, n is an integer of 1 to 5 and m and n are in such a relation as $m \geq ((6n+1)/4)$, and (II) a lithium ion conductive solvent.

7. An electrical appliance using lithium secondary batteries, which have a non-flammable liquid electrolyte, as a power source, which comprises a protection circuit for the lithium secondary batteries, and a protecting means for protecting overcharging and overdischarging of the lithium secondary batteries, said protecting means comprising a means for detecting a voltage or current of the lithium secondary batteries, and a means for on-off controlling the power source on the basis of detected voltage or current values, said protection circuit being operated by detecting the voltage or current of the lithium secondary batteries without monitoring temperatures and pressures thereof, wherein each lithium secondary battery comprises a lithium-storable and releasable negative electrode, a lithium-storable and releasable positive electrode, a separator and a lithium-salt containing non-aqueous liquid electrolyte, the non-aqueous liquid electrolyte containing at least 20% by volume of (I) a non-flammable fluorinated solvent which is a fluorinated ether represented by the following formula (1):

$$C_mF_{2m+1}\text{—}O\text{—}C_nH_{2n+1} \quad (1)$$

where m is an integer of 2 to 8, n is an integer of 1 to 5 and m and n are in such a relation as $m \geq ((6n+1)/4)$, and (II) a lithium ion conductive solvent in total.

* * * * *